July 26, 1960 W. S. FRAULA ET AL 2,946,091
PRESSES FOR THERMOSETTING COMPOSITIONS
Filed July 2, 1954 8 Sheets-Sheet 1

Inventors
William S. Fraula
Harry M. King
By Wallace and Cannon
Attorneys

July 26, 1960

W. S. FRAULA ET AL 2,946,091

PRESSES FOR THERMOSETTING COMPOSITIONS

Filed July 2, 1954

Inventors
William S. Fraula
Harry M. King
By Wallace and Cannon
Attorneys

July 26, 1960

W. S. FRAULA ET AL 2,946,091

PRESSES FOR THERMOSETTING COMPOSITIONS

Filed July 2, 1954

Inventors
William S. Fraula
Harry M. King

By Wallace and Cannon
Attorneys

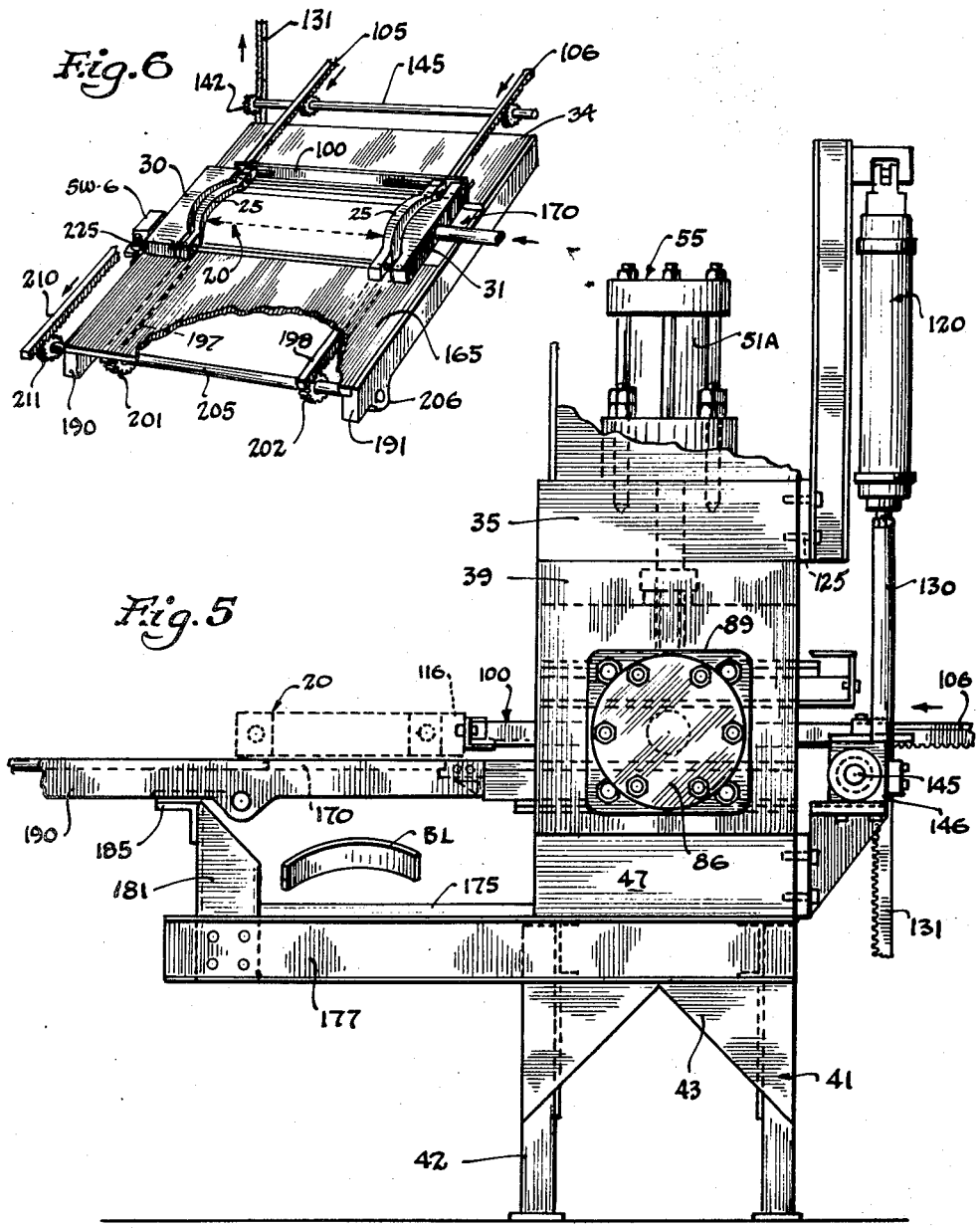

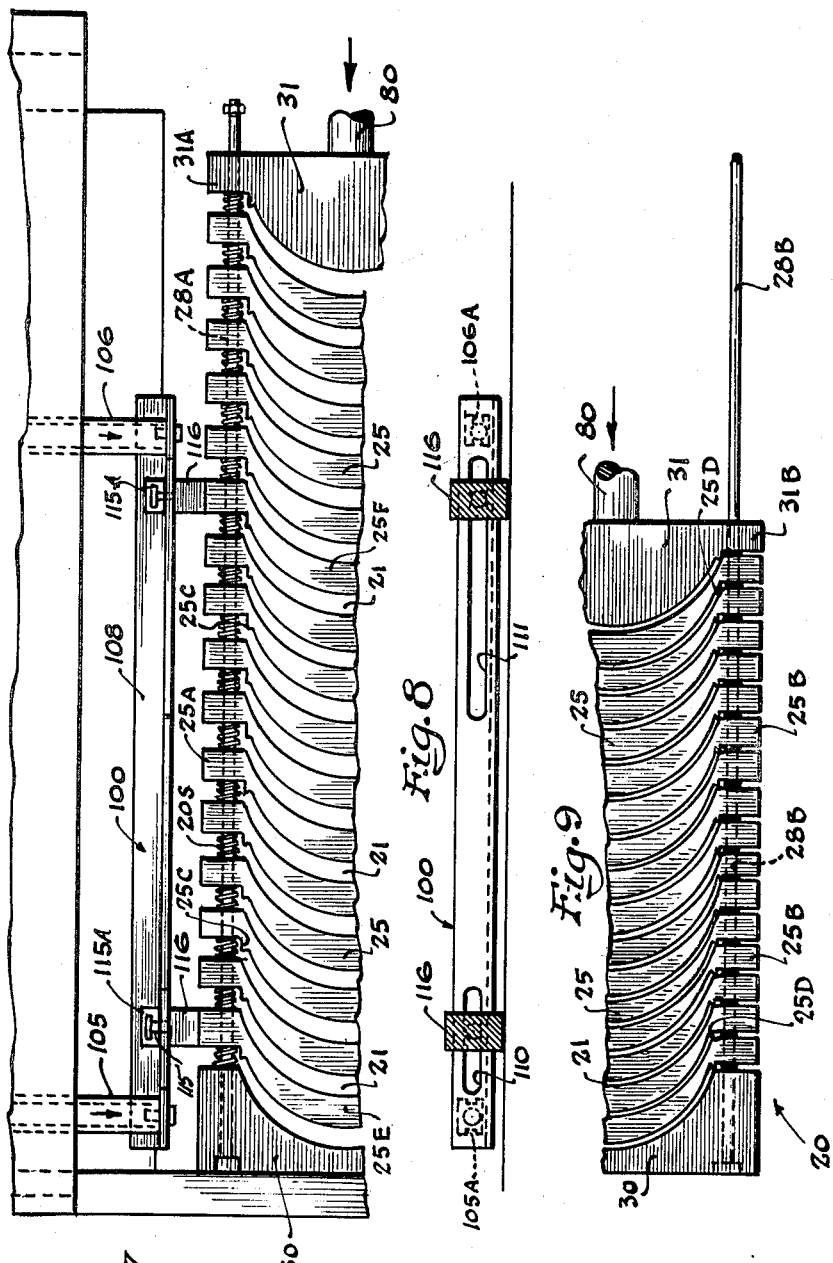

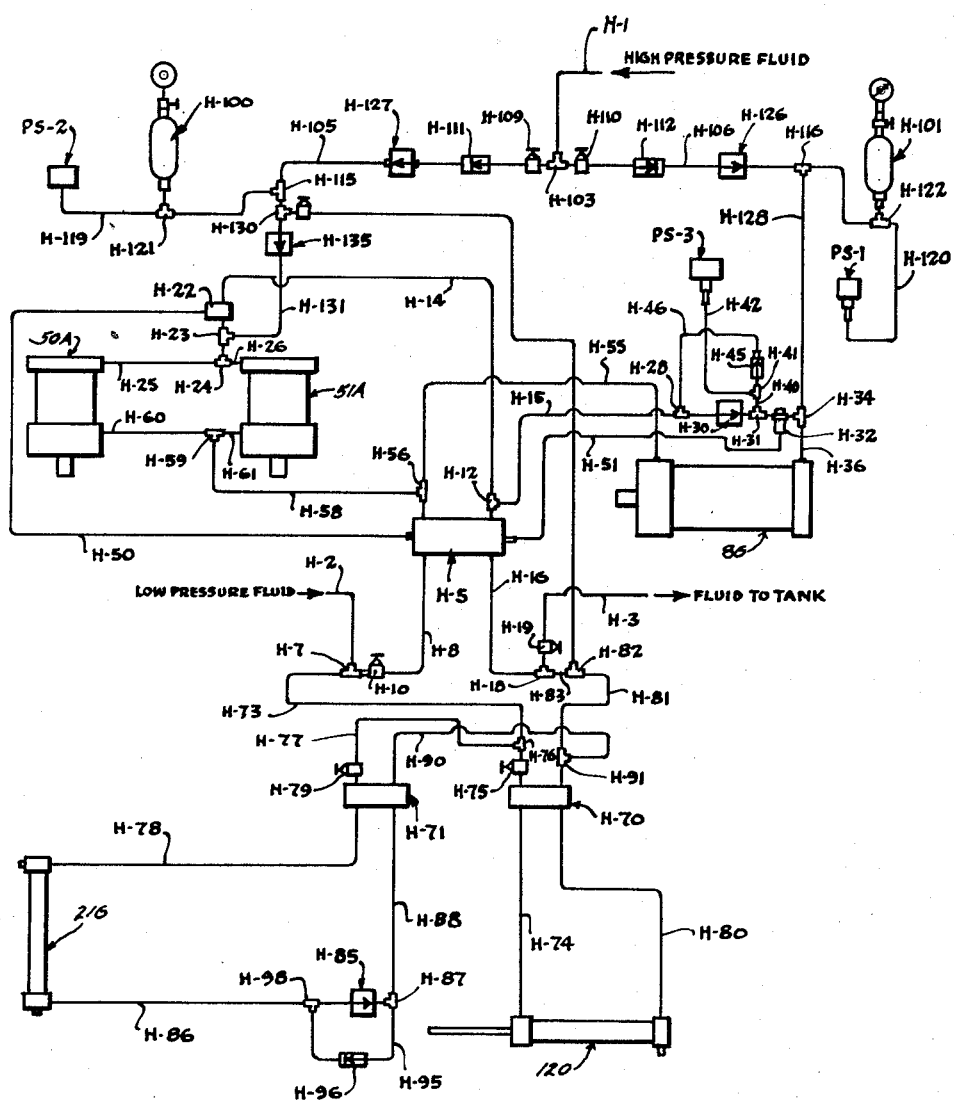

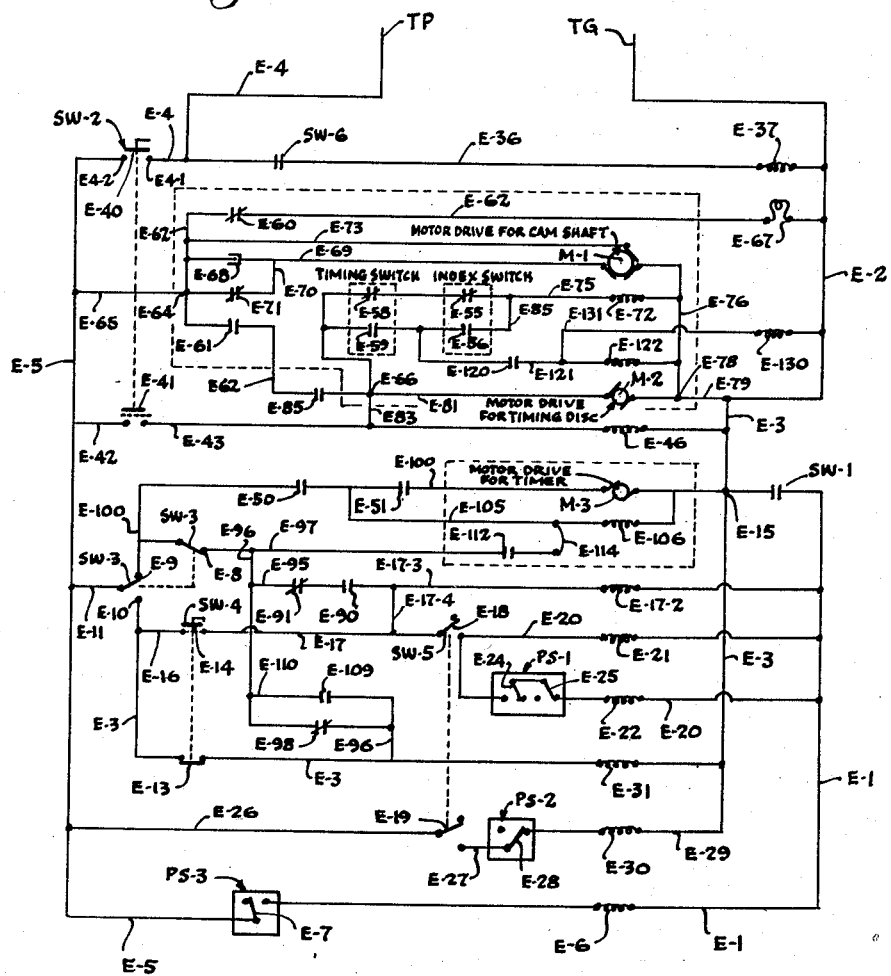

United States Patent Office 2,946,091
Patented July 26, 1960

2,946,091

PRESSES FOR THERMOSETTING COMPOSITIONS

William S. Fraula, Ridgewood, N.J., and Harry M. King, Dearborn, Mich., assignors to American Brake Shoe Company, New York, N.Y., a corporation of Delaware Filed July 2, 1954, Ser. No. 441,094

8 Claims. (Cl. 18—17)

This invention relates to a press of the kind adapted to cure thermosetting compositions by heat and pressure.

Included in the class of compositions which require thermal treatment in order to be reacted to an advanced stage, certain kinds require in addition the simultaneous application of pressure. Thus, a composition including an incompletely reacted resin such as a phenol-formaldehyde type resin normally must be subjected to a cure under heat and pressure. An example of such is composition brake lining material compounded of a filler in the form of asbestos fibers or the like and a thermosetting resin of the foregoing type serving as a bond. Usually, the incompletely reacted brake lining composition is first produced as a pre-form by a rolling operation so that it is subsequently necessary to subject these brake lining pre-forms to a heat and pressure operation to advance the resinous bonding material to a final stage of growth.

An object of the present invention is to enable thermosetting compositions of the foregoing kind to be cured in a press arranged to act upon an expandable and contractable die affording a plurality of the die cavities wherein the incompletely reacted thermosetting composition may be placed and subjected therein to die clamping forces applied in one direction and die compressive forces applied in another direction.

The die included in the press of the present invention is primarily adapted to be loaded with individual brake lining pre-forms, and therefore this die is provided with a plurality of arcuate shaped cavities that are to be compressed during the curing process. A further object of the present invention is to enable this die to be readily unloaded at the end of the curing cycle, and such unloading is to be carried out automatically in such a way that the cured linings are dumped all at once from the die to a receiving station. More specifically in this connection, it is an object of the present invention to allow the die to expand at the end of the curing cycle, to condition the press for ejecting the die when it is thus expanded, and to then pass the die on to an unloading table which is arranged to travel forwardly with the die thereby opening an unloading cavity through which the cured linings drop from the die when this cavity is fully disclosed.

When curing thermosetting compositions in a closed die, it is usually necessary to open the die on occasions during the curing cycle to enable gases formed during the reaction to be relieved. Such is known to the art as "bumping" the press, and a further object of the present invention is to include in the control circuit for the press a means for automatically bumping the press at predetermined intervals during the curing cycle. As was noted above, the die included in the press of the present invention is of an expandable and contractable nature, and during the course of curing forces as established by fluid under pressure are applied against the die in one direction to clamp the die between a pair of platens, and forces are applied in another direction to contract the die. The latter forces are of a critical nature in that these forces account primarily for establishing the pressure in the individual die cavities necessary to complete the cure of the thermosetting composition. It therefore becomes important to assure that these compressive forces are not mitigated by shrinkage of the composition being cured in the die cavities or by line leakage in the fluid system, and a further object of the present invention is to enable this to be accomplished.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 5 is a side elevation of the press, with certain parts being broken away;

Fig. 6 is a detail view, partly schematic in nature, illustrating the unloading feature embodied in the press;

Fig. 7 is a plan view, broken away, showing the die of the press expanded;

Fig. 8 is a sectional view through the die carriage shown in Fig. 7;

Fig. 9 is a plan view, broken away, of the die contracted.

Fig. 10 is a schematic representation of the fluid system for operating the press; and Fig. 11 is a schematic representation of the electrical control circuit for the press.

Figure 1:
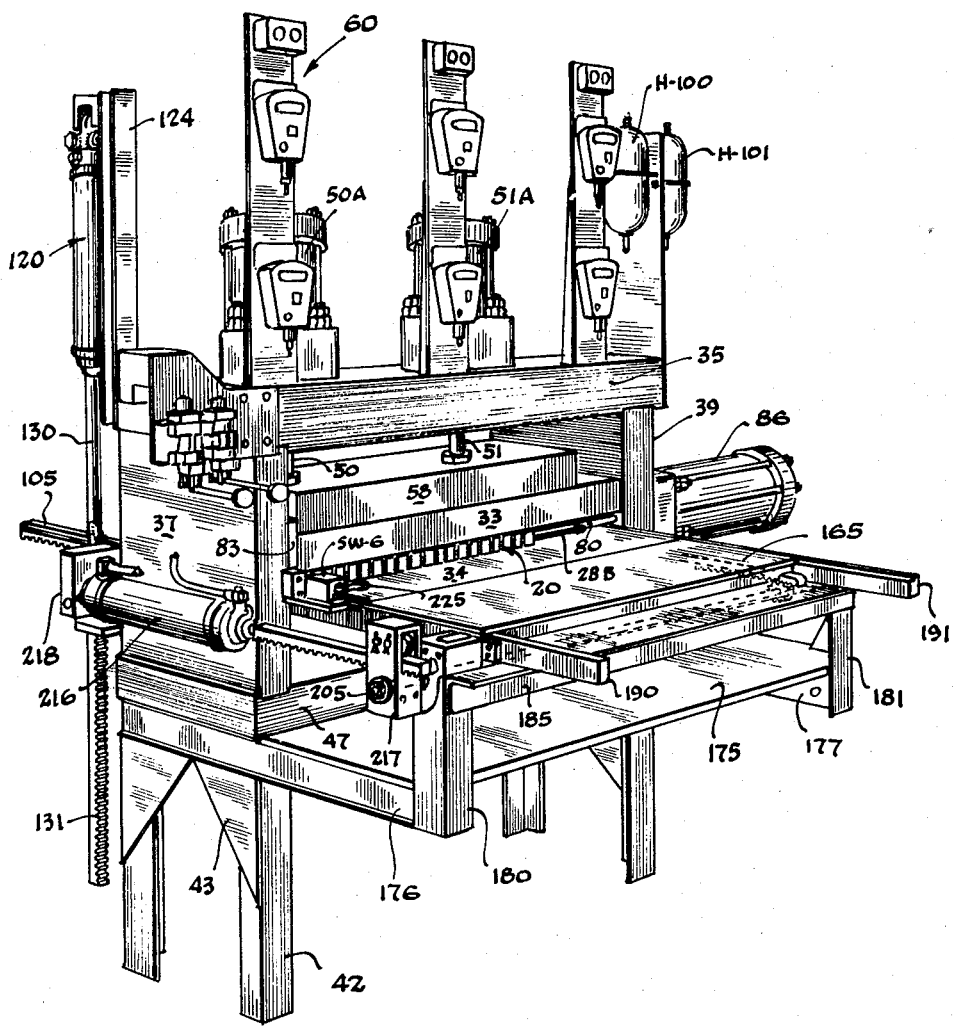
Fig. 1 is a perspective view of a press constructed along the lines of the present invention.

The press of the present invention illustrated in Figs. 1 to 9 is of a kind adapted to cure brake linings or the like such as BL, Fig. 5, comprising a thermosetting resinous bonding material that needs to be cured or advanced to a final stage of growth by heat and pressure. Thus, the press is to be furnished with so-called preforms or green linings that are to be arranged in a die 20, Fig. 9, which comprises a plurality of arcuately shaped die cavities 21. The die 20 is of an expandable and contractable nature as will be described presently and includes a plurality of individual die elements 25 which are to be disposed horizontally as a set in the press. Each such die element is in the form of an arcuately shaped block having vertically disposed arcuate faces so that the die cavities 21 afforded between successive ones of such elements conform generally to the arcuate nature of the brake linings as BL in the preformed state. At either end of the die elements 25 is an integral ear 25A and 25B each of which is bored to permit the die elements to be assembled as a set on a pair of corresponding guide pins 28A and 28B of a relatively long nature. At one end, the die 20 includes a reaction block 30 in which the heads of the pins 28A and 28B are positioned and at the opposite end the die 20 includes a pressure block 31 having ears 31A and 31B at either end formed with openings therein through which the ends of the pins 28A and 28B opposite the reaction block are passed.

Between successive ears 25A and 25B of the respective die elements, expansion springs 20S are mounted on the pins 28A and 28B so as to normally expand the die as shown in Fig. 7 to enable uncured brake lining preforms to be readily disposed therein. Suitable nuts are mounted on the ends of pins 28A and 28B to seat within the ears 31A and 31B of the pressure block 30 to limit the die expansion action of the springs 20S.

The sides of the die elements which face in the direction of the reaction block 30 are formed at either end with vertically extending projections as 25C and 25D, and during the course of disposing the brake lining preforms in the die cavities 21, the opposite ends of these preforms abut the respective projections 25C and 25D. After the die 20 has been loaded in this manner, compressive forces applied to the pressure block 31 compact the die elements against the action of the springs 20S, and under this circumstance, as shown in Fig. 9, the projections 25C and 25D at either end of the die elements close off the ends of the die cavities 21, and the arcuately shaped faces of the brake lining preforms are compacted between adjacent faces of successive die elements. The way in which the die 20 is to be disposed in the press of the present invention and subjected to pressure on all sides during the curing operation will be described presently.

As shown in Fig. 1, the die 20 in accordance with the present invention is to be retracted back in to the press between a vertically movable platen 33 disposed above the die and a fixed lower platen 34 on which the die 20 is positioned, and during the course of initiating operation of the press the upper platen 33 is closed vertically on the upper face of the die 20 to hold the die with a predetermined amount of pressure against the lower platen 34. When the upper platen is closed on the die in this manner, the die is clamped between the two platens thus assuring that the side edges of the brake lining preforms disposed in the die cavities 21 will be subjected to pressure during the course of curing.

Above the upper platen 33 is a relatively heavy horizontally disposed bedplate 35 which is supported at one side by a relatively heavy vertically disposed block 37, bolts as 38 being afforded to secure the bed 35 rigidly to these supporting blocks. At the side of the press opposite the block 37 the bed plate 35 is supported by another relatively heavy block 39, Fig. 5. These two blocks 37 and 39 are in turn disposed above a bench 41, Fig. 5, which includes legs as 42 in the form of angle irons. These legs of the bench are reinforced by gusset plates 43 so that a relatively rigid bench is afforded for the press.

The top of the bench 41 is afforded by channel beams 44, and resting on these is a lower bed plate 45. Bolts as 46 at either side of bed 45 are passed vertically therethrough into tapped openings in the bases of the respective side blocks 37 and 39, and from the foregoing it will be seen that the two bed plates 35 and 45 as interconnected by the blocks 37 and 39 afford a rigid structure for absorbing the forces engendered during operation of the press.

Figure 3:
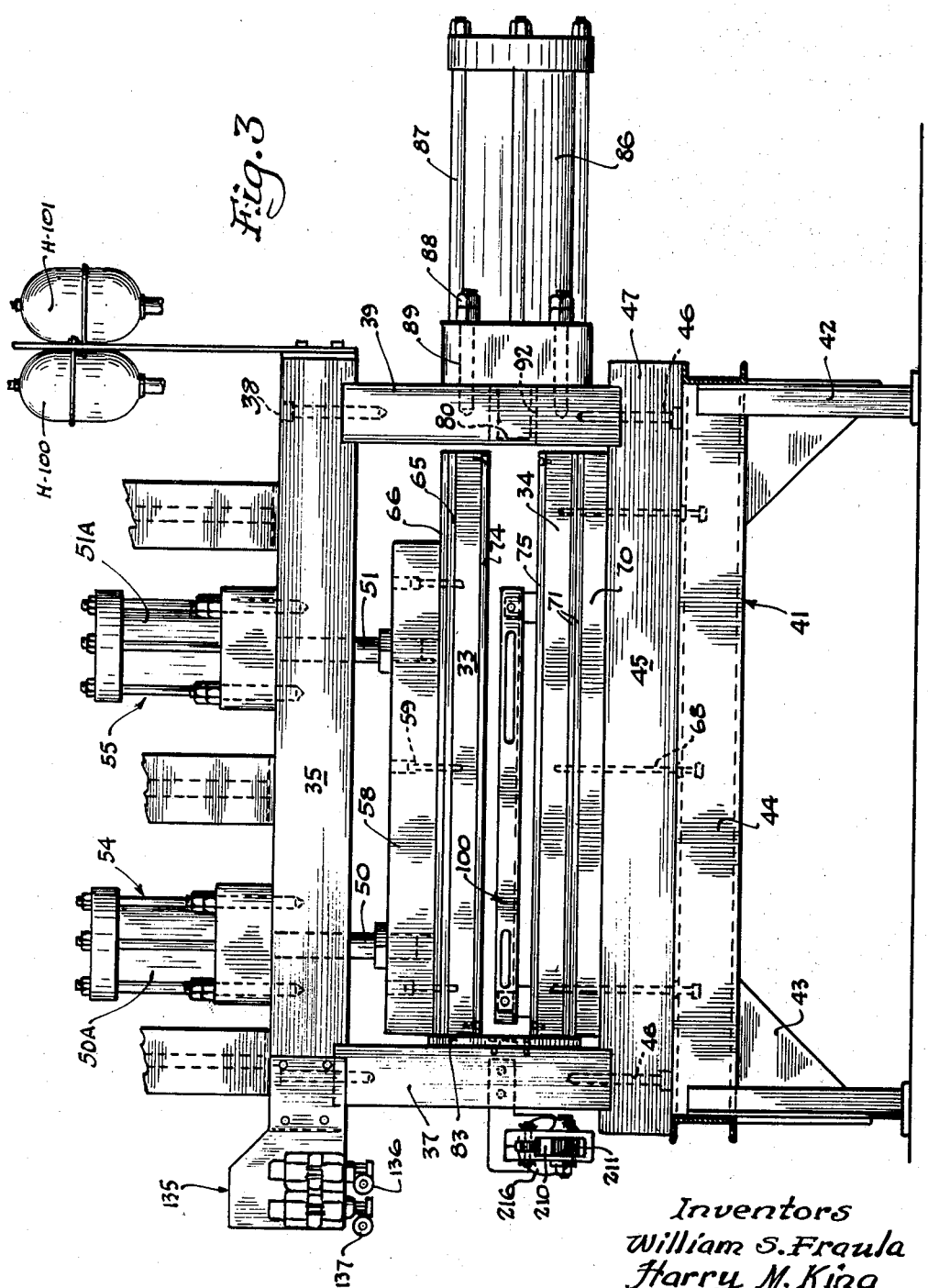
Fig. 3 is a front elevation of the press, certain parts being broken away, and the extension of the front of the press being removed.

In accordance with the present invention, a means is afforded for advancing the upper platen to close on the lower platen, and this means is in the form of a pair of vertically movable rams 50 and 51, Fig. 3. Thus, these rams extend through corresponding openings provided therefor in the upper bed 35 and are operated from a pair of corresponding hydraulic cylinders 50A and 51A respectively. These two cylinders are mounted in corresponding cages 54 and 55 which are rigidly secured to the top of the upper bed by bolts as shown in Fig. 3, and the arrangement is such that fluid under pressure is to be supplied to the tops of these cylinders to drive rams 50 and 51 downwardly through the bed 35. As will be described in detail below, the lower ends of the cylinders 50A and 51A are connected to a drain line during such advancing movement of the rams associated therewith.

The rams 50 and 51 are secured to a bolster block 58, and bolts as 59 passed through the bolster block are threadedly mounted in corresponding tapped openings afforded in the top of the upper platen 33 to couple the upper platen to the bolster.

To enable the upper platen to heat the composition to be cured when the upper platen is closed on die 20, electrical resistance elements of the usual kind (not shown) are arranged in the upper platen. Panels as 60, Fig. 1, disposed at the front edge of the upper bed 35 have indicating and control instruments mounted thereon whereby the temperature of the upper platen may be regulated and observed during the curing cycle. These resistance elements are exposed in the top side of the upper platen 30 and in this condition are covered by an insulating plate 65. Arranged between the bolster 58 and the sheet of insulation 65 is a back-up plate 66.

The lower platen 34 is supported on the lower bed 47, and suitable bolts as 68 are extended up through the top of the bench and through the bed 47 to tapped openings in the lower platen. A spacer plate 70 is disposed on the top of the lower bed 47, and between the spacer plate 70 and the upper platen 34 are shim plates as 71 which may be selected as to number or thickness to position the lower platen 34 accurately in a fixed relation relative to the center line of a ram 80, Fig. 3. The two platens are faced with respective wear plates 74 and 75, and it is these wear plates which directly engage the opposite top and bottom faces of the die 20 when the latter is positioned between the platens of the press.

As was noted above, the die 20 is of an expandable and contractable nature which enables the die cavities 21 therein to be readily loaded and unloaded. When initially disposed between the platens 33 and 34 prior to closing the press, the die elements 25 are normally expanded by the springs 20S, and to enable the die cavities 21 to be contracted for curing the composition therein under pressure, a ram 80 is arranged at the side of the press as shown in Fig. 1 to apply pressure to the pressure block 31 included in the die in a direction normal to the closing or advancing direction of the one platen on the other. In this connection, a heating plate 83 is fastened to the inside face of plate 37 as shown in Fig. 3, and this plate is adapted to be engaged by the reaction block 30 included in the die 20 when the die 20 is fully retracted beneath the platens 33 and 34.

A means is afforded to advance and retract ram 80 relative to the die 20, and in the present instance such means is in the form of a cylinder 86 adapted to be furnished with fluid under pressure. The cylinder 86 is mounted in a cage 87 which is disposed at right angles to the block 39 on the side of the press, and suitable bolts as 88 are threadedly mounted in tapped openings afforded therefor in the block 39 to secure the base 89 of the cylinder cage 87 to the side of the press. Ram 80 is centered in an opening 92 formed in the block 39 and is normally retracted therein as shown in Fig. 3. The arrangement for driving the rams 50, 51 and 80 is such that after the die 20 has been positioned between the platens of the press, the upper platen 33 is first quickly closed on the lower platen 34 to clamp the die 20 therebetween. Under this condition, the springs 20S in the die 20 are still effective to hold the die cavities 25 expanded, whereupon fluid under pressure supplied to cylinder 86 is then effective to drive ram 80 in an advancing direction against the pressure block 31 included in the die 20. This sequence of operation is desired in order that ram 80 compressing the die will not cause the uncured composition in the die cavities 25 to extrude therefrom on to the platens. It may here be pointed out that the die and the platens of the press are effectively lubricated as by graphite to enable the die 20 to be compressed while clamped between the platens as aforesaid.

Advancing and retracting movements of the rams 50, 51 and 80 is controlled through a 4-way valve, H-5, Fig. 10, the operation of which will be described in detail below. This valve has two positions, a press open position and a press close position, and the valve is shifted between these positions by a pair of corresponding solenoids E-17-2 and E-31, Fig. 11. The 4-way valve H-5 is first conditioned for operation by a series of switches that will be described below, such that once the die 20 containing the composition to be cured has been located between the platens, these switches are actuated to enable valve H-5 to shift to the press close position whereupon fluid under pressure is supplied to the tops of cylinders 50A and 51A and to the outer end of cylinder 86 disposed away from the block 39. The arrangement of the system for supplying operating fluid to the cylinders 50A, 51A and 86 is such that at the same time the opposite ends of these cylinders are connected to drain lines which clear the cylinders of fluid in front of the advancing rams. This condition is maintained until the desired curing period has been terminated which may be at the end of the entire curing cycle or during intermediate periods in the curing cycle wherein the press is to be "bumped."

At the termination of these periods when it is desired to open the press by retracting rams 50, 51 and 80 away from the die 20, this may be accomplished automatically by means to be described below or as a manual operation through a switch SW-4, Fig. 11. The nature of the control circuit in this regard will be described below, but it may here be pointed out that valve H-5 is set by solenoid E-31 in the press open position. When thus set, valve H-5 is effective to furnish fluid under pressure to the bottoms of cylinders 50A and 51A and to the inner end of cylinder 86 while at the same time connecting the opposite ends of these cylinders to drain lines, thus enabling the rams to be driven in a retracting direction to relieve die 20.

For retracting and ejecting the die 20 into and from the platen cavity, a carriage 100, Figs. 5, 6, 7 and 8 is afforded. This carriage includes a pair of spaced racks 105 and 106 which are arranged as to be forced either in die advancing or die retracting direction. Connected across the front of the racks 105 and 106 is an arm 108, and it is this arm which affords a connection for the rear of the die 20 to the carriage 100. Thus, a pair of slots 110 and 111 are formed in the face of the arm 108. A pair of die elements as 25E and 25F, Fig. 7, are selected for connection to the carriage, and adapters as 116 are attached as by bolts to the ears 25A of die elements 25E and 25F. These adapters include reduced shanks 115 having enlarged heads as 115A at the ends thereof which are passed through the slots 110 and 111 afforded in the carriage arm 108. U-shaped washers (not shown) are afforded on the shank 115 between the heads 115A thereof and the carriage arm 108, and in this way, the carriage 100 and the die 20 are secured together. The way in which the carriage is to be shifted back and forth for die ejecting and die retracting operation will now be described.

A cylinder 120, Figs. 1 and 5, is supported vertically at the back of the press. This cylinder is suspended from a bracket 123, and the bracket 123 in turn is mounted on a vertically disposed mounting plate 124 connected to the rear of the bed plate 35 as by bolts 125. Operating in the cylinder 120 is a piston 130, and this piston carried a rack 131 which is adapted to impart driving movement to the carriage 100 in either direction.

Figure 2:
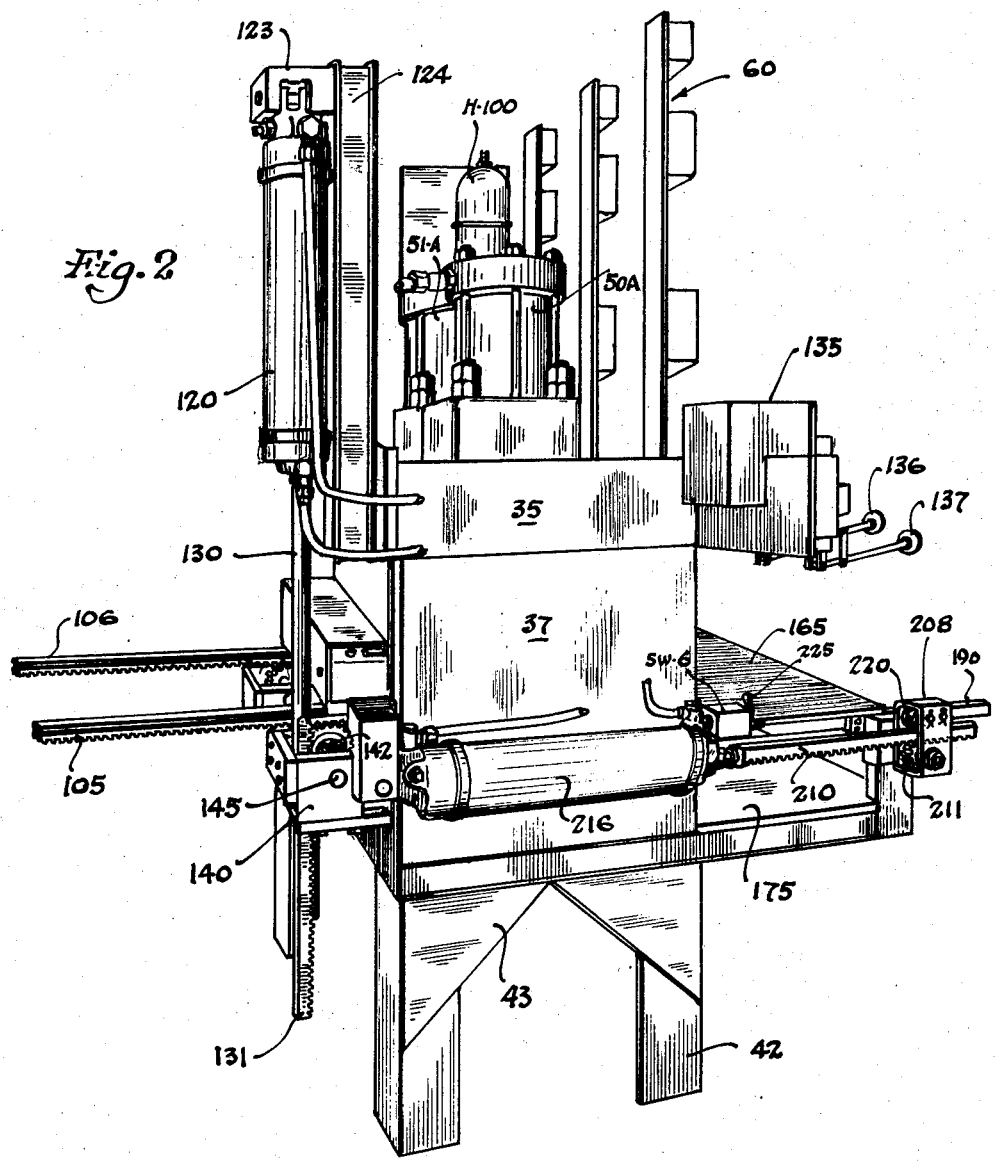
Fig. 2 is a perspective view of the press looking in a different direction.

Normally, piston 130 is down in the cylinder 120, and when fluid under pressure is furnished to the lower end of cylinder 120 piston 130 and the rack 131 carried thereby are driven upwardly. For controlling the action of piston 130 in this manner, a plate 135 mounted on the bed plate 35 at the front of the press, as shown in Fig. 2, supports a pair of valves H-70 and H-71, Fig. 10. Valve H-70 is associated with the system for furnishing fluid to cylinder 120 and is controlled by a corresponding one of a pair of valve handles 136 and 137, so that by accordingly shifting valve H-70 in this manner fluid is furnished to the bottom of cylinder 120 and at the same time, valve H-70 is effective to connect the top of cylinder 120 to a drain line to enable ram 130 to be driven upwardly.

Figure 4:
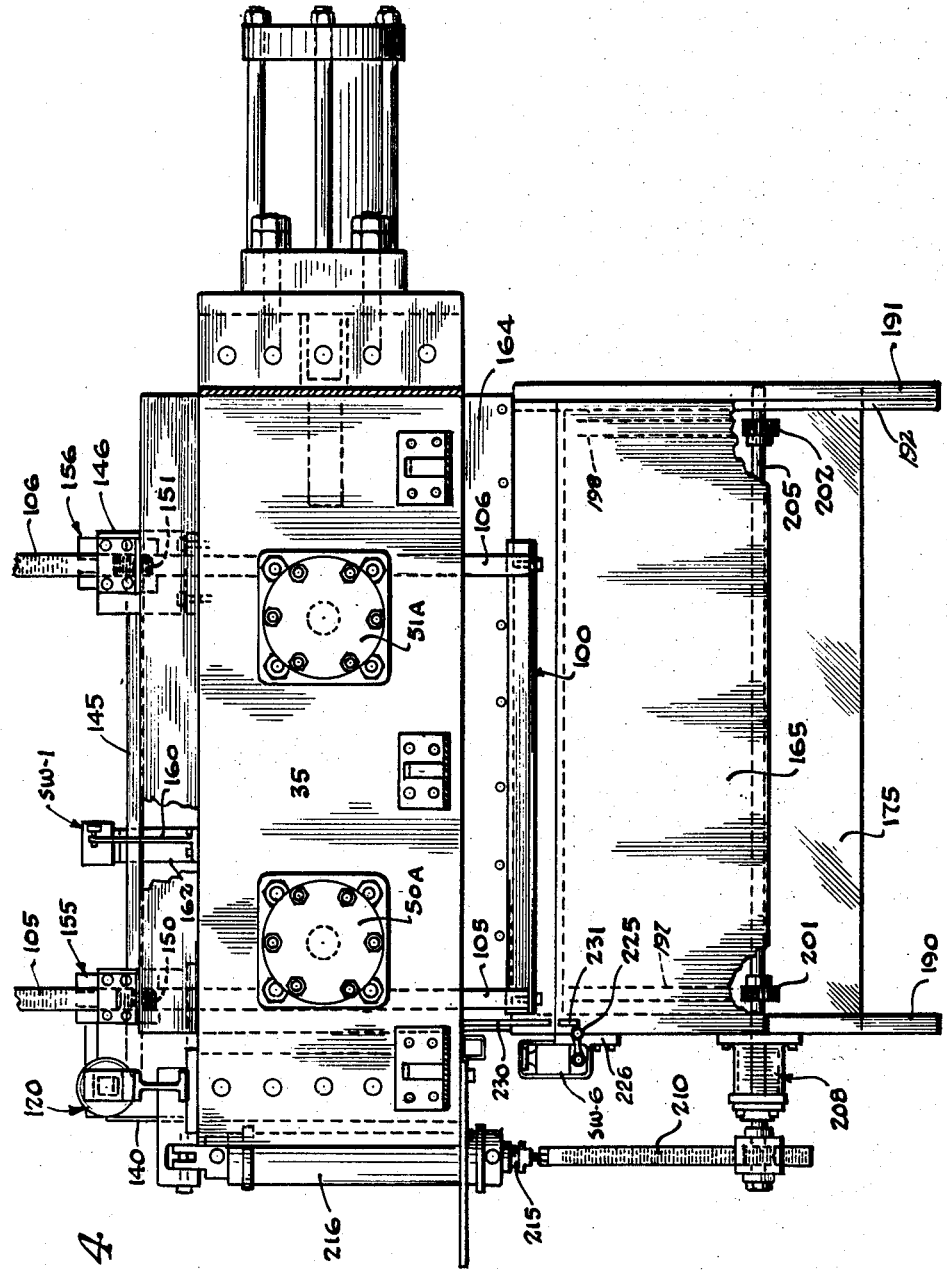
Fig. 4 is a top plan view of the press, with certain parts being broken away.

Disposed in a bearing mount 140 at the back of the press is a pinion 142 that is meshed with rack 131. This pinion is carried on a shaft 145 extending across the back of the press from one side to the other as can be seen in Fig. 4, and at the side of the press opposite the bearing mount 140 shaft 145 is supported in another bearing mount 146. Arranged on shaft 145 intermediate pinion 131 and the bearing mount 146 are a pair of pinions 150 and 151. Pinions 150 and 151 are meshed with racks 105 and 106 respectively as can be seen in Figs. 4 and 6, and accordingly as piston 130 is advanced upwardly in cylinder 120 as described above, pinions 142, 150 and 151 are rotated clockwise as viewed in Fig. 2, driving racks 105 and 106 in a forward or die ejecting direction. On the other hand, when valve H-70 is reversed, these pinions are rotated in the opposite direction which effects retraction of the die carrier back between the platens.

To support and guide racks 105 and 106, a set of spaced apart guide rails 155 and 156 are arranged in the bearing mounts 140 and 146 respectively, and as shown in Fig. 8 the racks 105 and 106 are each formed at either side with slots as 105A and 106A which are adapted to slide along the guide rails 155 and 156.

At the back of the press in alignment with an arm 160 projecting rearwardly from the die carriage 100 is a switch SW-1 supported in an outboard relation by a bracket 162. This switch is so positioned that when the carriage 100 is operated as described above to fully retract the die 20 to an operative position beneath the upper platen, arm 160 holds switch SW-1 closed. This condition must be attained before the press can be closed, and the nature of this condition will be described below in connection with the control circuit of the press.

Under and in accordance with the present invention a means is afforded to enable the cured composition in the die cavities 21 to be unloaded and dumped at the end of the curing cycle without need for extracting the cured compositions manually one by one from the die cavity. In the present instance, this unloading feature is attained by ejecting the die 20 from the press on to a table which opens to permit the cured compositions in the die to drop through an unloading cavity to a receiving station.

Thus, an extension 164, Fig. 4, is afforded for the lower platen 34 and normally abutting the forward edge of this extension is a horizontally disposed table 165 the top of which is in the plane of the top of the platen 34 and the extension 164 thereof. This table is arranged to advance in a forward direction as the die 20 is ejected from the press by cylinder 120, and the arrangement is such that this co-action occurs when the die 20 reaches a predetermined position during its forward advancing movement from between the platens. In the present instance, this end is attained by a sensing element which is actuated just as the die being ejected from the press passes on to the rear marginal edge portion of table 165 abutting the platen extension 164, and means are thereby conditioned at this time to enable the table 165 and die 20 to travel forwardly together. As this occurs, a cavity of increasing dimension opens between the rear edge of the table 165 and the forward edge of the platen extension 164. This cavity, 170, is illustrated in Figs. 5 and 6 in its expanded condition, the die 20 bridging the cavity 170 to enable the cured compositions as the brake linings BL to drop from the expanded die to an unloading station afforded by a stationary table 175, Figs. 1 and 2 disposed beneath the unloading cavity.

To support table 165 for movement of this kind, an extension is afforded at the front of the press by attaching a pair of channel beams as 176 and 177 in a forward outboard relation to the bench 41. The receiving table 175 below table 165 is supported on the flanges of the channel beams 176 and 177, and at the forward ends of these beams a pair of vertical posts 180 and 181 are arranged. Anchored at either end to the posts 180 and 181 is a horizontally disposed angle beam 185, and this angle beam serves to support a pair of arms 190 and 191 along which the table 165 is adapted to travel, these arms in turn being anchored to the lower platen extension 164.

To guide table 165 during the course of its forwardly advancing movement, arm 191 is milled to afford a rail 192 on which the corresponding side marginal portion of the table 165 is disposed to travel, as shown in Fig. 4. The opposite side of the table 165 travels along the top of arm 190, as can be seen in Figs. 1 and 4, and a guide key (not shown) is afforded at the underside of table 165 in position to travel along the inner side of arm 190 to prevent lateral displacement of the table 165.

Anchored in spaced relation at the underside of the table 165 are a pair of racks 197 and 198, Fig. 6. These racks are meshed with a pair of corresponding pinions 201 and 202 which when rotated counterclockwise as viewed in Fig. 6 force racks 197 and 198 and table 165 in a forward advancing direction. The pinions 201 and 202 are fixed to a drive shaft 205 afforded therefore, and on one end this drive shaft is rotatably supported in a bearing lug 206 depending from arm 191. At the opposite end portion, shaft 205 extends through a bushing in arm 190 and is rotatably supported in a bearing 208 attached to arm 190.

To drive shaft 205, a rack 210 is meshed with a corresponding pinion 211 mounted on the portion of shaft 205 which projects from the bearing mount 208. A housing 217 encloses pinion 211 and includes a bushing for the end of shaft 205.

Rack 210 is adapted to be driven by a piston 215, Fig. 4 associated with a cylinder 216 disposed horizontally at the side of the press. The rear end of cylinder 216 is supported by a bracket 218 at the back of the press, and the forward end of rack 210 is adapted to ride in the pinion housing 217, being engaged therein by rollers as 220 serving to hold the rack 210 in meshed relation with pinion 211.

The piston 215 for driving the rack 210 is adapted to be operated in either direction by fluid under pressure in cylinder 216, and the flow of fluid under pressure to cylinder 216 is regulated by a corresponding one of the handles 136 and 137 associated with the valve plate 135. Thus a valve H-71 is disposed on the valve plate 135, and when the rack 210 is to be driven forwardly, this valve is opened to admit fluid under pressure to the rear of cylinder 216, and at the same time the setting of valve H-71 in this manner connects the forward end of cylinder 216 to a drain line H-88, Fig. 10, conditioning the piston 215 to advance. Forward advancing movement of the rack 210 drives pinions 211, 201 and 202 in a counterclockwise direction as viewed in Fig. 6 carrying racks 197 and 198 and the table 165 associated therewith forwardly along the arms 190 and 191.

As was noted above, movement of table 165 in a forward direction is commenced when the die 20 being ejected from the press is sensed as having passed on to table 165. This position is marked by a trip 225 which when tripped closes a switch SW-6 attached to table 165 by a bracket 226, and the arrangement is such that this trip is disposed in the path of the die being ejected from the press. Accordingly, as the die 20 advances in a forward direction along the lower platen, switch SW-6 is closed by die 20 engaging trip 225, and when this occurs fluid is enabled to drain from the front of cylinder 216 through a valve H-85 in a manner to be described below, enabling piston 215 and rack 210 associated therewith to advance in a forward direction. Table 165 thereupon commences to advance away from the platen extension 164 to define an unloading cavity of gradually increasing dimension. Under this circumstance, the die 20 and table 165 advance forwardly together so long as switch SW-6 is held closed. When the limit of upward movement of the piston 130 has been reached, die 20 ceases forward movement and as table 165 pulls away from the leading end of the die, switch SW-6 opens stopping the table. The adapters 116 are so selected that when this condition is attained the unloading cavity 170, Fig. 6, is fully disclosed and bridged by the ears of the die elements enabling the cured compositions to drop out of the expanded die cavities on to the receiving table 175.

As shown in Fig. 4 a pair of relatively narrow guides 230 and 231 are arranged in fixed position at the side edge of the lower platen and at the side edge of table 165 respectively. These guides are adapted to fit into a corresponding guide slot formed in the bottom side of the reaction block 30 included in the die 20, enabling the die 20 to be guided by rail 230 accurately on to rail 231 on table 165 during die ejection. Thus, just as the forward ears 25B of the die elements pass on to table 165, switch SW-6 is closed so that as the die 20 and table 165 advance forwardly together the leading end of the die is supported by the rear marginal portion of table 165. It will be appreciated in this connection that in the event table 165 pulls away from the leading end of the die while opening the unloading cavity, switch SW-6 will open halting table 165 until the die advances sufficiently to re-close switch SW-6. When the unloading cavity 170 has been fully disclosed as shown in Fig. 6, the rear ears 25A of the die elements, on the other hand, are supported on the forward marginal portion of the platen extension 164.

To load the die 20 with a new set of preforms, it is first necessary to close the unloading cavity 170 as shown in Fig. 6, and this is accomplished by shifting valve H-71 in a reverse direction to furnish fluid under pressure to the front of cylinder 216. At the same time, as will be described below, the back of cylinder 216 is drained. Accordingly, piston 215 is operated to retract rack 210 reversing table 165 to close the unloading cavity. The die is then reloaded, and valve H-70 is reversed to furnish fluid under pressure to the top of cylinder 120 while connecting the bottom of this cylinder to a drain line. Rack 131 is driven downwardly and its stroke is regulated to retract die 20 beneath the platens to a position where the center line thereof is aligned with ram 80 and arm 160 on the die carriage closes switch SW-1.

HYDRAULIC OPERATION OF THE PRESS

The press described above is adapted to be operated hydraulically by furnishing fluid under pressure to the several cylinders. Two sources of fluid under pressure are afforded. Thus, the hydraulic system includes a line H-1, Fig. 10, connected to a source of fluid under high pressure, which for example may be at 1500 p.s.i., and another line H-2 which is connected to a source of fluid under low pressure, which for example may be at 350 p.s.i. A third line H-3 is arranged to connect the cylinders to a drain tank (not shown) accordingly as the rams and pistons associated with these cylinders are to be reversed in a manner to be described more specifically below. Thus in those instances where the resinous composition disposed in the die cavities can be cured with low pressure, fluid under low pressure in line H-2 will be resorted to exclusively, but where the nature of the resin is such as to require high pressure to complete the cure high pressure fluid in line H-1 is to be resorted to.

For advancing or retracting the rams associated with cylinders 50A, 59B and 86, a 4-way valve H-5 of a known kind adapted to be set either in a press open position or a press close position is associated with the low pressure lines. Normally, this valve is set in the press open position, and the setting of this valve in either position is controlled by a corresponding solenoid E-17-2 or E-31, Fig. 11, which will be described below in connection with the electrical circuit for controlling operation of the press.

Line H-2 connected to the source of low pressure fluid leads to a T-fitting H-7. A line H-8 leads from the T-fitting H-7 into the 4-way valve H-5, and arranged in this line is a needle-type valve H-10 which may be set to a predetermined position to control the rate of flow of fluid from the low pressure source to the 4-way valve H-5. When the 4-way valve is set in the press close position by solenoid E-17-2, fluid under low pressure is directed to cylinders 50A, 51A and 86 for advancing the rams associated therewith toward the die 20 positioned between the platens of the press, and to enable this to be accomplished a T-fitting H-12 is connected to the 4-way valve H-5. Leading from this T-fitting are a pair of low pressure lines H-14 and H-15, and when valve H-5 is in the aforementioned press close position this valve is effective to couple lines H-14 and H-15 to the low pressure line H-8. Also at this time, other lines leading from cylinders 50A, 51A and 86 in an arrangement which will be described below are connected by valve H-5 to a drain line H-16. Thus, line H-16 leads from valve H-5 to the tank line H-3, and such is attained in the present instance by connecting lines H-3 and H-16 to respective arms of a T-fitting H-18. A needle-type valve H-19 is afforded as a shut-off for line H-3.

Line H-14 is associated with cylinders 50A and 51A and is connected to a pilot check valve H-22. This check valve is normally down to admit fluid under low pressure in line H-14 to a T-fitting H-23, and from this T-fitting to another T-fitting H-24. Lines H-25 and H-26 are connected to respective arms on the T-fitting H-24, and these lines lead in to the tops of cylinders 50A and 51A respectively to admit fluid under low pressure thereto. Therefore, when the 4-way valve H-5 has been set in the press close position, fluid under low pressure in lines H-25 and H-26 is supplied thereto to advance rams 50 and 51 simultaneously to close the upper platen 33 and the lower platen 34.

Line H-15 is associated with cylinder 86. This line is led through a T-fitting H-28 and from this T-fitting through a one-way normally open solenoid controlled valve H-30. From valve H-30, line H-15 is led through a T-fitting H-31 and a normally down pilot check valve H-32 to a T-fitting H-34. Connected to one arm of the T-fitting H-34 is a line H-36 leading to the outer end of cylinder 86, so that the ram 80 associated therewith may be driven inwardly against die 20 positioned between the platens of the press by fluid under low pressure in line H-15 when the 4-way valve H-5 is set in the press close position, provided of course that valve H-30 is open.

It will be appreciated from the foregoing that valve H-5 enables rams 50, 51 and 80 to be actuated in an advancing direction to clamp the die 20 with vertically applied pressure between the platens 33 and 34 and to compress the die cavities 25 with horizontal pressure as applied by ram 80.

A pressure sensitive switch PS-3 is arranged in the control circuit for valve H-30, in a way to be described below in connection with the control of the press, but it may here be pointed out that switch PS-3 is set to close valve H-30 when this switch senses that the desired upper limit of low pressure for advancing ram 80 in cylinder 86 has been attained. Thus, during a curing operation carried out under low pressure applied on all sides of the die 20, it is desired that low pressure of a particular value be maintained in cylinder 86 inasmuch as the pressure exerted by ram 80 is of critical nature from the curing standpoint and accordingly switch PS-3 is set to close valve H-30 when this pressure has been attained.

To enable switch PS-3 to sense the pressure of fluid being furnished to cylinder 80 by way of line H-15, a line H-40 is connected to the other arm of the T-fitting H-31 at one end and at the opposite end is connected to a T-fitting H-41. A line H-42 leading to the pressure switch PS-3 is also connected to the T-fitting H-41, and on the third arm of this fitting a check valve H-45 is arranged to afford a by-pass through a line H-46 around valve H-30 and back to T-fitting H-28 on the opposite side of valve H-30. The nature of this by-pass will be described below in connection with opening of the press.

The foregoing connections enable cylinders 50A, 51A and 86 in the press to hold the rams associated therewith closed against die 20 exclusively with low pressure, and to retract these rams away from the die the 4-way valve H-5 is reversed to the press open position. Under this circumstance, low pressure fluid initially resorted to to clamp and compress the die is drained from the cylinders and at the same time fluid under low pressure is supplied to the cylinders for retracting the rams, enabling the die to expand and be ejected from between the platens to the unloading station. To enable this to be accomplished, the pilot check valves H-22 and H-32 are lifted and fluid under low pressure is directed to the lower ends of cylinders 50A and 51A and to the inner end of cylinder 86. At the same time, the opposite ends of these cylinders are drained through lines H-3 and H-16 to the tank. Thus, when the 4-way valve H-5 is set in the press open position by the corresponding solenoid E-31, Fig. 10, a line H-50 leading from valve H-5 to the pilot check valve H-22 is furnished with fluid under low pressure, another line H-51 leading from valve H-5 to the pilot check valve H-32 is simultaneously furnished with fluid under low pressure, and lines H-14 and H-15 are coupled with line H-16 leading to the tank line H-3.

The pilot check valves H-22 and H-32 each include a 20:1 operating ratio enabling these valves to be lifted against the fluid in lines H-14 and H-15, so that as these pilot check valves are lifted by fluid under low pressure in lines H-50 and H-51, in this manner, fluid in lines H-25, H-26 and H-36 is adapted to drain back through check valves H-22 and H-32 respectively. With respect to cylinder 86, such drainage will occur through check valve H-45 and the by-pass line H-46 described above, inasmuch as valve H-30 is a one way valve.

For conducting fluid under low pressure to cylinders 50A, 51A and 86 to retract the corresponding rams when valve H-5 is in the press open position, a line H-55 leading from valve H-5 is arranged to be coupled through this valve to the low pressure line H-8. Line H-55 is connected to the inner end of cylinder 86. A T-fitting H-66 is afforded in line H-55, and a line H-58 is connected between this T-fitting and another T-fitting H-59 from which lines H-60 and H-61 lead to the bottom of cylinders 50A and 51A respectively. Accordingly, since the pilot check valves H-22 and H-32 have both been lifted as described above, low pressure fluid in lines H-55, H-58, H-60 and H-61 will effect retraction of the corresponding rams relieving the press and enabling the dies to be ejected. This condition will prevail until the press is to be closed once more.

For ejection and unloading of the dies, a pair of valves H-70 and H-71 are arranged on the valve plate 135 for manual operation by the corresponding handles that were described. Thus, valve H-70 is associated with die ejecting cylinder 120 which is adapted to advance die 20 out from between the platens. Both valves H-70 and H-71 are associated with the source of low pressure fluid inasmuch as these cylinders merely perform the die unloading operation described above. Thus, a line H-73 is connected to T-fitting H-7 in the low pressure line H-2, and line H-73 leads to valve H-70. From valve H-70 a line H-74 leads to the lower end of cylinder 120, and this line is adapted to be coupled to line H-73 to elevate the piston in cylinder 120 in a manner to be described presently.

Arranged in line H-73 is a needle-type valve H-75 adapted to regulate the rate of fluid passing through line H-73 to valve H-70. A T-fitting H-76 is also afforded in line H-73, and connected to this T-fitting is a line H-77 leading to valve H-71. Leading from valve H-71 is a line H-78 which connects to the rear end of cylinder 216 which operates the unloading table 165. Line H-78 is adapted to be coupled to line H-77 in a way to be described presently. A needle-type valve H-79 is arranged in line H-77 to regulate the rate of fluid passing from line H-77 in to valve H-71.

To actuate the piston 130 of cylinder 120 in a die ejecting direction, valve H-70 is shifted by accordingly operating the corresponding handle for this valve, coupling lines H-73 and H-74. At the same time the top of cylinder 130 is drained to permit the piston to rise therein in the following manner.

A line H-80 leads from the upper end of cylinder 120 to valve H-70. A line H-81 associated with line H-80 for draining the top of cylinder 120 is connected at one end to valve H-70 and at the other end to a T-fitting H-82 which is connected to T-fitting H-18 in line H-3. When lines H-73 and H-74 are coupled as described above, lines H-80 and H-81 are coupled at the same time to drain the top of cylinder 120 to the tank, and this enables piston 130 to be raised by fluid under low pressure passed thereto from line H-74. Accordingly, the dies are ejected from between the platens by racks 105 and 106 in the die carriage 100.

It will be recalled from the description set forth above regarding the mechanical details of the press that forward advancing movement of the table 165 for unloading the die 20 is controlled by a limit switch SW-6 which is closed as the leading end of die 20 advancing forwardly from between the platens passes on to table 165. Switch SW-6 when closed energizes a solenoid which will be described below in connection with the control circuit and this solenoid when energized opens a one-way normally closed solenoid controlled valve H-85, Fig. 10, associated with cylinder 216 for reciprocating table 165. Valve H-85 is arranged in a line H-86 connected to the forward end of cylinder 216, and this line is attached to a T-fitting H-87 in a line H-88 leading to valve H-71. Associated with line H-88 and leading from valve H-71 is a line H-90 which is connected at the other end to a T-fitting H-91 in the drain line H-81. Accordingly, it will be seen that when valve H-85 is open, line H-86 is adapted to drain the forward end of cylinder 216. By shifting appropriately the manual control handle for valve H-71, lines H-77 and H-78 are coupled to furnish fluid under low pressure to the rear end of cylinder 216. Such shifting movement of the operating handle for valve H-71 connects at the same time lines H-88 and H-90 so that any fluid at the forward side of the piston 215 will be passed through valve H-85 to the drain line. In this connection it will be appreciated that table 165 cannot be advanced forwardly until switch SW-6 is closed to open valve H-85.

After the die has been unloaded, table 165 in its advanced position is retracted to abut in normal position against the forward extension 164 of the lower platen. This is accomplished by actuating valve H-71 manually by the corresponding handle to furnish fluid under low pressure to the forward end of cylinder 216, and at the same time line H-78 is connected by valve H-71 to line H-90 leading to the drain line enabling fluid in the rear portion of cylinder 216 to flow to the tank.

To enable the piston 215 to be retracted under this condition, a line H-95 containing a check valve H-96 is connected to the T-fitting H-87 and by-passes valve H-85 to a T-fitting H-98 in line H-86. When valve H-71 is actuated as described above to couple lines H-78 and H-90 for draining the cylinder 216, lines H-77 and H-88 are coupled to furnish fluid under low pressure in line H-73 to the by-pass line H-95 and through the check valve H-96 to the forward end of cylinder 216.

The extent of rearward movement of piston 215 for table retraction is adjusted so that the rear edge of table 165 will engage the forward edge of the platen extension 164, and in this position table 165 is fully retracted beneath die 20 in its advanced position, whereupon the die cavities 25 may be loaded with a new set of braking lining preforms or the like that are to be cured. After this loading operation has been performed, valve H-70 is actuated to drive piston 130 downwardly to cause the die carriage 100 to retract the die back between the platens 33 and 34. Thus, when valve H-70 is actuated in this manner by the corresponding handle, line H-80 is coupled to line H-73 through valve H-70 and at the same time line H-74 is coupled to the drain line H-81.

If, during a curing cycle under low pressure, the press is to be "bumped" this is accomplished simply by actuating valve H-5 to the press open position whereupon all rams 50, 51 and 80 are retracted relieving vertical pressure as well as the lateral compressive forces against the die 20, enabling the die to expend for expelling the gases formed during the curing reaction. Such "bumping" operations are controlled in a way which will be described in connection with the control circuit.

If the press is to be operated during the curing cycle by means of high pressure, fluid under high pressure in line H-1 is supplied to cylinders 50A, 51A and 86. In this connection it will be noted that a pair of accumulator tanks H-100 and H-101 supported on a panel are attached to the upper bed of the press, and these accumulators are afforded for storing fluid under a predetermined amount of high pressure. The operation of these accumulators is somewhat different one from the other for a reason to be explained below, but both assure that the necessary amount of high pressure fluid is supplied immediately upon demand from the press. These accumulators are of a known kind and are gas-ballasted, that is, high pressure fluid in the accumulators H-100 and H-101 is stored under pressure therein by a given quantity of nitrogen gas as compressed by high pressure fluid in line H-1.

To furnish fluid under high pressure to the accumulators H-100 and H-101, a T-fitting 103 is afforded in line H-1, and lines H-105 and H-106 are connected to the respective arms of this T-fitting so as to conduct fluid under high pressure to the respective accumulators. Needle-type valves H-109 and H-110 are arranged in lines 105 and 106 on opposite sides of the fitting H-103 to enable the rate of flow of fluid through these lines to be regulated. Additionally, check valves H-111 and H-112 are afforded in lines H-105 and H-106 respectively to enable fluid therein to pass accordingly in one direction only.

Line H-105 terminates at a T-fitting H-115, and line H-106 terminates at a T-fitting H-116. From these T-fittings, lines H-119 and H-120 respectively lead to T-fittings H-121 and H-122 that are connected to the respective accumulators H-100 and H-101. Lines H-119 and H-120 terminate at respective pressure switches PS-1 and PS-2 which are adapted to sense the pressure of the operating fluid as is contained in the accumulators H-100 and H-101 respectively.

Pressure switch PS-1 is associated with and adapted to control the opening and closing of a normally closed solenoid controlled valve H-126 in line H-106, and pressure switch PS-2 is associated with and adapted to control a normally closed solenoid controlled valve H-127 in line H-105. The way in which these pressure switches control opening and closing of corresponding valves H-126 and H-127 controlled thereby will be described in more detail hereinbelow in connection with the control circuit, but it may here be mentioned that when the pressure switch PS-2 senses that the pressure in the accumulator H-100 is below that desired for operation the contact in this switch closes to energize a solenoid E-30 for opening valve H-127. Hence, this arrangement assures that there is fluid under high pressure in accumulator H-100 immediately available at all times.

The arrangement for accumulator H-101 is somewhat different inasmuch as this accumulator is so arranged as to assure that constant pressure is maintained in cylinder 86 to hold die 20 contracted with that degree of pressure required by the thermosetting composition in the die cavities 25 for proper cure. Thus, a line H-128 is connected at one end to the T-fitting H-116 in line H-106, and at the other end to T-fitting H-34 which conducts operating fluid through line H-36 to the outer end of cylinder 86.

From the foregoing it will be seen that pressure switch PS-1 is arranged to sense directly the pressure of fluid being delivered to cylinder 86 through line H-128, whereas pressure switch PS-2 senses only the pressure of the fluid contained in accumulator H-100. Accordingly, if, during operation of the press, the pressure of the fluid in line H-128 as supplied by accumulator H-101 drops off, the contact in pressure switch PS-1 will close to energize a solenoid E-22, Fig. 11. This solenoid controls the normally closed valve H-126, so that the arrangement of switch PS-1 assures that valve H-126 is held open until accumulator H-101 is satisfied.

Based on the areas of the brake linings to be compressed, switch PS-1 has a substantially lower set point as compared to the set point for switch PS-2.

To enable fluid under high pressure in accumulator H-100 to be supplied to cylinders 50A and 51A, a T-fitting H-130 is connected to T-fitting H-115. A line H-131 is led out of the T-fitting H-130 to the T-fitting H-23 described above which conducts fluid to lines H-25 and H-26. Arranged in line H-131 below the T-fitting H-130 is a normally closed solenoid controlled valve H-135 which is normally effective to withhold high pressure fluid from cylinders 50A and 51A. The solenoid controlled valve H-135 is arranged to be controlled by a solenoid E-21, Fig. 11, and the arrangement is such that when this solenoid is energized valve H-135 is opened and fluid under high pressure stored in accumulator H-100 is supplied to the tops of cylinders 50A and 51A for driving the rams 50 and 51 therein downwardly to close the upper platen on the lower platen. This of course occurs only when the press is set for high pressure operation by means of a switch SW-5, Fig. 11 to be described below.

The control circuits for the solenoids E-21 and E-22 associated with and adapted to control valves H-126 and H-135 are in the same circuit as will be described below. Thus, when the solenoid for valve H-135 is energized to open valve H-135 fluid under high pressure will be furnished through line H-131 to cylinders 50A and 51A, and when the solenoid for valve H-126 is energized fluid under high pressure is furnished to cylinder 86 through line H-128 and at the same time to accumulator H-101 until the latter is satisfied. To initiate delivery of fluid under high pressure in this manner, the 4-way valve H-5 is set in the press close position by means of the corresponding solenoid E-17-2, and under this circumstance low pressure fluid in lines H-60 and H-61 is drained through line H-58 and H-16 to the tank as described above. At the same time, low pressure fluid in line H-55 associated with cylinder 86 is drained to the tank in the same way so that the corresponding cylinder rams may be actuated by fluid under high pressure in an advancing direction. It may be here pointed out that initially the ram in cylinder 86 is first actuated in an advancing direction by fluid under low pressure before fluid under high pressure is furnished thereto through line H-128. Consequently, the upper platen 33 is closed on the die 20 prior to ram 80 being effective to compress the die with fluid under high pressure in cylinder 86, and such assures that the uncured thermosetting composition in the die cavities does not extrude therefrom when the ram 80 eventually contracts the die under high pressure. This sequence of fluid control in cylinder 86 is attained through a normally opened contact E-24 in pressure switch PS-1. Thus, the arrangement, as will be described in more detail below, is such that until contact E-24 is closed, fluid under low pressure is resorted to to initially advance the ram in cylinder 86, and when this contact does close a circuit is completed through a normally closed contact E-25 to solenoid E-22 which when energized opens the valve H-126 to enable fluid under high pressure to flow through lines H-128 and H-120.

The press is thus held closed with fluid under high pressure until the end of the curing cycle or until it is determined that the press is to be "bumped." To open the press, it is first necessary to shift valve H-5 to the press open position by energizing solenoid E-31. When valve H-5 is thus shifted to the press open position, lines H-14 and H-15 are coupled through the 4-way valve H-5 to the drain line H-16, and at the same time lines H-50, H-51, H-55 and H-58 are connected to line H-8 which furnishes fluid under low pressure to these lines for retracting rams 50, 51 and 80.

Drainage of the aforementioned lines in this instance is controlled through the pilot check valves H-22 and H-32. Thus, it will be recalled that these valves are lifted by a mechanical advantage arrangement when fluid under low pressure in lines H-50 and H-51 is directed therethrough. Thus, when pilot check valve H-22 is lifted in this manner, fluid under high pressure in lines H-25, H-26 and H-131 is enabled to pass back through check valve H-22 to line H-14. Similarly, when pilot check valve H-32 is lifted by low pressure fluid in line H-51, fluid under high pressure in lines H-36, H-120 and H-128 is enabled to pass through this check valve to check valve H-45, and back to line H-15 through the by-pass line H-46 which shunts valve H-30.

As high pressure fluid is drained from the cylinders in the foregoing manner, fluid under low pressure supplied to lines H-55 and H-58 by valve H-5 effects retraction of the corresponding rams. Consequently it is now possible to eject and unload the dies, and this is accomplished by cylinders 120 and 216 as described above.

CONTROL CIRCUIT

*Manual operation—high pressure*

To enable the press to operate under any circumstance, it is necessary that the die carrier be fully retracted beneath the platens to closet the limit switch SW-1 located at the back of the press. Thus, the limit switch SW-1 is arranged in series with a wire E-1 which in turn is connected to a ground terminal TG by intermediate wires E-2 and E-3. Another wire E-4 is connected at one end to a positive terminal TP of the power source and at its other end is connected to a terminal E-4-1 of a normally open manually operated start switch SW-2. The opposite terminal E-4-2 of this switch is connected to a wire E-5 leading to a contact of E-7 of pressure switch PS-3 which is normally open. Wire E-1 terminates at the other terminal of switch PS-3, and a solenoid E-6 is arranged in series therewith for controlling the normally open valve H-30. Accordingly, solenoid E-6 is held deenergized so long as contact E-7 is open to hold valve H-30 open. As will be described in more detail hereinbelow in connection with automatic operation of the press, switch SW-2 has two sets of contacts, E-40 and E-41, as well as two operative positions. For manual control, only one contact E-40 is utilized which in the first operative position of the switch SW-2 connects wires E-4 and E-5 through the contact terminals E-4-1 and E-4-2.

A manually operated switch SW-3 having two sets of contacts is afforded for setting the press either for automatic or manual control. This switch is normally set for automatic control, and to enable the press to be manually controlled switch SW-3 is moved to the manual control position. Setting the switch SW-3 in this manner breaks the switch at terminals E-8 and E-9 thereof and makes at E-10. The contact of switch SW-3 associated with terminals E-9 and E-10 is connected to wire E-5 by a wire E-11 and the contact associated with terminal E-10 is connected to wire E-3 as shown.

A manually operated switch SW-4 having two sets of contacts is arranged to enable the platens of the press to be opened and closed as desired during manual control of the press. One contact E-13 of this switch is normally closed and is in series with wire E-3 to hold the 4-way valve H-5 in the press open position in a manner to be described presently. The other contact E-14 is normally open and is arranged when closed to effect delivery of fluid under low pressure to the tops of cylinders 50A and 50B for closing the platen and to the outer end of cylinder 86 for compressing the dies. Thus, a wire E-16 leads from wire E-3 in to the contact E-14 of switch E-4, and another wire E-17 leads out of switch contact E-14 to a normally open manually operated switch SW-5 the operation of which will be described below.

As was noted in the description above of the hydraulic system, the 4-way valve H-4 is controlled by a pair of solenoids. One of these solenoids, E-17-2, is adapted, when energized, to shift valve H-5 to the press close position, and such action is attained in the present instance by arranging a wire E-17-3 in series with solenoid E-17-2. One end of this wire is connected to wire E-1, and the other end to a wire E-17-4 which in turn is connected to wire E-17. From this it will be seen that when switch SW-4 is actuated to close contact E-14 on wires E-16 and E-17, solenoid E-17-2 will be energized to shift the 4-way valve H-5 as described above to deliver fluid under low pressure to cylinders 50A, 51A and 86 through lines H-14 and H-15 instituting advancing movement of the corresponding rams.

Pressure switch PS-3 is set to the upper limit of low pressure in line H-15. Accordingly, when this switch is operative, contact E-7 thereof closes to energize solenoid E-6 when the upper limit of low pressure in line H-15 has been detected, causing the normally open solenoid controlled valve H-30 associated therewith to close which interrupts the flow of fluid to cylinder 86. However, inasmuch as the press is to be operated under high pressure, switch PS-3 may be disabled under this circumstance so that valve H-30 remains open.

Switch SW-5 has one position for enabling the rams in the press cylinders to operate entirely from fluid under low pressure, and another to permit fluid under high pressure to be delivered to cylinders 50A, 51A and 86 at a predetermined time after low pressure fluid has been supplied thereto in the initial portion of the cycle. This switch includes two contacts E-18 and E-19 both of which are normally open under which condition the press operates entirely with low pressure fluid. However, by closing this switch manually, contact E-18, which is in series with wire E-17, is connected to a wire E-20 having arranged in series therewith a solenoid E-21 for controlling the normally closed solenoid controlled valve H-135. At the end opposite switch contact E-19, wire E-20 is connected to wire E-1 leading to ground.

Accordingly, by closing switches SW-4 and SW-5 when the press has been set for manual operation, both solenoids E-17-2 and E-21 may be energized provided of course that switches SW-1 and SW-2 have also been closed. When solenoids E-17-2 and E-21 are energized in this manner, the 4-way valve H-5 is operated to deliver fluid under low pressure to cylinders 50A, 51A and 86 through lines H-14 and H-15, and valve H-135 is opened at the same time to furnish fluid under high pressure stored in accumulator H-100 to the tops of the cylinders 50A and 51A through line H-131, thus causing the upper platen to close on the dies with high pressure.

In order that fluid under high pressure will also be delivered to cylinder 86 to compress the die 20 laterally with high pressure, the controls for valves H-126 and H-135 are arranged in series, and this is attained by leading wire E-20 through pressure switch PS-1 to a solenoid E-22 that normally holds valve H-126 closed. The pressure switch PS-1 that controls delivery of fluid under high pressure through valve H-126 includes two independently operable contacts responsive to pressure in the hydraulic line H-120. One such contact, E-24, is normally open with respect to wire E-20 so that no power is delivered to solenoid E-22, and the other, E-25, is normally closed in this regard. Contact E-24, like contact E-7 of pressure switch PS-3, is sensitive to the upper limit of low pressure furnished to cylinder 86 through lines H-15 and H-36, and contact E-25 on the other hand is sensitive to the upper limit of high pressure furnished to cylinder 86 through line H-128. Thus, when contact E-24 senses that the low pressure initially resorted to for advancing the die compression ram 80 inwardly against the die is no longer effective, contact E-24 closes on wire E-20 and this effects energization of solenoid E-22 causing valve H-126 to open, inasmuch as contact E-25 opens only when the upper limit of high pressure has been passed. In this manner, high pressure is supplied to lines H-120 and H-128 until pressure switch PS-1 determines that accumulator H-101 has been satisfied, whereupon contact E-25 opens, deenergizing solenoid E-22 and permitting valve H-126 to assume its normally closed position. Both contacts E-24 and E-25 of course have a predetermined differential to prevent continuous oscillation about the particular limit selected for operation, and accordingly contact E-25 in particular will open and close occasionally while the press is in operation, as in the event of line leakage and gradual shrinkage of the brake linings during the course of curing, to assure that the predetermined high pressure is maintained against the die within the selected differential at all times. It will be appreciated also that once the limit of low pressure in the line H-15 has been passed in the early stage of the cycle, contact E-24 will remain closed throughout the cycle to supply power to contact E-25 and will remain closed at least until the ram 80 is retracted as described above.

As was noted in the description set forth above in connection with the hydraulic system, a pressure switch PS-2 is afforded to assure that accumulator H-100 is charged at all times with fluid under high pressure. To enable this to be attained, pressure switch PS-2 is arranged in series with a solenoid for the normally closed solenoid controlled valve H-127, and this circuit includes contact E-19 of switch SW-5. Thus, a wire E-26 is connected at one end to the switch contact E-19 and at the other end is connected to wire E-5. When switch SW-5 is closed, contact E-19 contacts the terminal of a wire E-27, and wire E-27 is connected in turn to the normally closed contact E-28 of pressure switch PS-2. A wire E-29 is extended from contact E-28 to solenoid E-30 for controlling valve H-127, and this circuit is completed by connecting wire E-29 to wire E-3. Accordingly, when switch SW-5 is closed, solenoid E-30 will be energized through contact E-28 of the pressure switch PS-2 provided that this pressure switch senses that the pressure in the accumulator H-100 is below the desired valve. Thus, contact E-28 is arranged to break upon a rise of pressure in the accumulator H-100 above the predetermined high valve, and again a differential is afforded in the pressure switch PS-2 to prevent oscillation of the contact E-28 about the set point.

From the foregoing, it will be seen that by setting switch SW-5 for high pressure operation and switch SW-3 in the manual control position, the upper platen 33 will close on the lower platen 34 and the ram 80 will advance, provided of course the switches SW-1, SW-2 and SW-4 are closed. To open the press, it is merely necessary to open switch SW–4 causing contact E–14 to open across the wires E–16 and E–17. This deenergizes solenoids E–21 and E–22 for valves H–135 and H–126. At the same time, solenoid E–17–2 is deenergized which enables the valve H–5 to be reversed to the press open position by a circuit which will now be described.

When switch SW–4 is opened, contact E–13 of this switch completes a circuit to the solenoid E–31 included in the 4-way valve H–5 which is adapted when energized to shift this valve to the press open position. Thus, contact E–13 is arranged in series along wire E–3 that is connected at one end to the terminal E–10 of switch SW–3 and which at the other end is connected to wire E–2 described above. Solenoid E–31 is arranged in series in this circuit. Accordingly when contact E–13 makes in wire E–3, solenoid E–31 is energized, and inasmuch as solenoid E–17–2 is deenergized when contact E–14 breaks, the 4-way valve H–5 is shifted to the press open position. In this connection, it will be recalled from the description set forth above of the hydraulic system that such movement of the 4-way valve H–5 to the press open position drains the high pressure fluid from cylinders 50A, 50B and 86 and feeds fluid under low pressure in to these cylinders to raise the upper platen 33 and retract ram 80 away from the die. This is the condition which will prevail at the commencement of the next curing cycle on a new set of preforms.

When the press is opened, die 20 may be advanced out from between the platens and this is accomplished through valve H–70 associated with cylinder 120 as described above in connection with the hydraulic system of Fig. 10. At the same time, valve H–71 is shifted to condition cylinder 216 for actuation of table 165 which, however, cannot be attained until switch SW–6 is closed by the outwardly advancing die set. Thus, inasmuch as valve H–85 remains normally closed at this time, the low pressure fluid in cylinder 86 used to retract piston 215 in the previous cycle cannot escape to the tank so that cylinder 86 is not yet conditioned to move table 165 forwardly.

As the die 20 advance forwardly, switch SW–1 is opened in the manner described above, to prevent the press from being closed inadvertently. As the die 20 passes the normally open switch SW–6 carried by the table 165, this switch is closed and power is delivered to a solenoid that controls valve H–85. Thus, switch SW–6 is in series with a wire E–36 that extends between wires E–2 and E–4. Also in series with wire E–36 is a solenoid E–37 for valve H–85, so that when switch SW–6 is closed solenoid E–37 is energized opening valve H–85 which permits line H–86 to drain through lines H–88 and H–90. The table 165 then advances with die 20 as described above, and the linings are dumped through the unloading cavity 170.

After the dies have been emptied, valve H–71 is actuated to couple line H–77 to line H–88 and line H–78 to line H–90 leading to the drain line. This enables fluid under low pressure to be delivered to the forward end of cylinder 216 through line H–86 and the by-pass line H–95, and cylinder 216 as well to be drained at the back through line H–78. Accordingly, fluid under low pressure furnished to the front of cylinder 216 reciprocates table 165 to a fully retracted position where the rear edge of table 165 abutts the forward edge of the lower platen etxension 164.

The die cavities 25 may then be loaded with a new set of preforms, and after this has been accomplished valve H–70 is actuated to couple lines H–73 and H–80 and to couple lines H–74 and H–81. This delivers fluid under low pressure to the top of cylinder 120 and fluid at the bottom of the cylinder passes to the tank, driving piston 130 and the rack 131 associated therewith downwardly. The racks 105 and 106 on the die carriage 100 are pulled back. When the die carriage 100 is fully retracted beneath the upper platen, switch SW–1 is closed and the press is conditioned for a new cycle.

CONTROL CIRCUIT

Manual operation—low pressure

When it is desired to operate the press under low pressure exclusively, say at about 350 p.s.i., switch SW–5 is allowed to remain in the normal or open position so that no power is delivered to solenoids E–21, E–22, and E–30. Under this circumstance then, only solenoids E–6, E–17–2 and E–31 are adapted to be energized. Assuming that switches SW–1 and SW–2 are closed and that switch SW–3 is set in the position described above for manual operation, the press is closed and the die compress ram in cylinder 86 advanced by closing switch SW–4 which interrupts power to solenoid E–31 to enable the 4-way valve H–5 to be set in the press close position by solenoid E–17–2. At the same time, solenoid E–17–2 is energized, and this causes the 4-way valve H–5 to shift to the press close position wherein fluid under low pressure is directed to the cylinders 50A, 51A and 86 inasmuch as valve H–30 is normally held open by contact E–7 of pressure switch PS–3 in the open position shown. If pressure switch PS–3 detects that the limit set for the low pressure has been exceeded, contact E–7 thereof makes, solenoid E–6 is energized and valve H–30 closes. Subsequent to this, reverse operation of contact E–7 occurs if the low pressure in line H–15 is sensed by switch PS–3 as being under the limit set, and in this way pressure switch PS–3 assures that low pressure of a continuous nature is maintained in cylinder 86 for compressing the die.

At the end of the curing time, or if the press is to be "bumped," switch SW–4 is opened. Contact E–13 thereof closes, and contact E–14 opens. This deenergizes solenoid E–17–2 and energizes solenoid E–31 so that the 4-way valve H–5 shifts to the press open position. Cylinders 50A, 51A and 86 are thereupon drained as fluid under low pressure in lines H–50 and H–51 is effective to lift the pilot check valves H–22 and H–32, and at the same time fluid under low pressure is supplied to these cylinders through lines H–55 and H–58 as described above to raise the upper platen 33 and retract ram 80 away from the die, thus enabling the latter to be advanced out from between the press platens as described above in connection with "Manual operation—high pressure."

Automatic operation

Under manual operation of the press, opening and closing movements are controlled by the switch SW–4, and in those instances where it is necessary to "bump" the press intermittently this must be done by intermittent operation of switch SW–4. By setting the press for automatic control, these operations can be carried out automatically through a timing means adapted to close the press at the commencement of a cycle, "bump" the press after predetermined time intervals during the cycle, and open the press at the end of the cycle. Such timing means in the present instance includes a Bristol cycle controller and a timer both of a known construction. The cycle controller determines when the press is to be "bumped," or opened at the end of the curing cycle, and the timer controls the time interval during which the press remains open during these periods. Thus, for example, the cycle controller may be set to hold the press closed after the curing cycle has been commenced for a series of one minute intervals during the early portion of the curing cycle and to hold the press closed for longer time intervals during the later portions of the curing cycle. In between these intervals, the press is "bumped" automatically by the cycle controller in a way which will be described, and the time that the press remains open during these bumping periods, say for three or four seconds, is regulated by the timer.

As noted above, the switch SW–3 is normally set for automatic operation, so that under the circumstance of automatic control it is only necessary to actuate switch SW-2, assuming of course that the dies are fully retracted between the platens to hold switch SW-1 closed. Also, if high pressure is to be utilized during automatic operation for cylinders 50A, 51A and 86, switch SW-5 is actuated to enable solenoids E-21 and E-22 to be energized in an automatic sequence through the timing means in a way which will now be described, first in connection with the Bristol cycle controller, and then in connection with the timer.

Switch SW-2 has two contacts E-40 and E-41, as well as two operative positions as was mentioned above. Thus, for operation of the press manually, it will be recalled that switch SW-2 was pressed in only to the extent that contact E-40 thereof bridges wires E-4 and E-5 and is locked in this position under this condition, contact E-41 remaining open and inoperative. For automatic operation on the other hand, switch SW-2 is momentarily pressed in all the way and released so that contact E-41 momentarily bridges a pair of wires E-42 and E-43. Wire E-42 is connected to wire E-5, and wire E-43 is connected to wire E-3. In series with wire E-43 is a relay E-46 which is associated with a holding circuit, and it will be seen that when contact E-41 becomes operative in this manner, relay E-46 is energized. The function of the holding circuit associated with relay E-46 will be described in detail below following a description of the Bristol cycle controller.

The Bristol cycle controller includes two motors M-1 and M-2. Motor M-1 is arranged to intermittently drive a cam shaft (not shown) having arranged therewith a pair of cams (not shown) for closing and opening two normally open cam switches E-50 and E-51. This same cam shaft carries a third or indexing cam (not shown) for controlling a reversing index switch which includes a normally closed contact E-55 and a normally open contact E-56.

Motor M-2 is arranged for continuous operation between a zero or initial position and a re-set or terminal position. On the shaft of motor M-2, there is arranged a timing cam (not shown). This particular cam is in the form of a timing disc having notches arranged at predetermined time intervals on the periphery thereof which determine when the press is to be "bumped" and also when the press is to be opened at the end of the cycle. A timing switch having a normally closed contact E-58 and a normally open contact E-59 includes a follower (not shown) positioned to engage and ride on the notched timing disc, and the arrangement is such that the contacts E-58 and E-59 in this switch reverse positions each time a notch arrives at the follower for the timing switch and each time this same notch passes the timing switch follower. Thus, each notch in the timing cam reverses the timing switch twice in the time interval required for the notch to traverse the timing switch follower, and it is this time interval during which the press is "bumped" for a period of time determined by the timer, operation of which will be described separately hereinbelow.

For indicating that the Bristol timer is in its initial or zero position, a zero switch having a normally closed contact E-60 and a normally open contact E-61 is arranged to be actuated by a trip lever (not shown) disposed on the aforesaid cam shaft of motor M-1 which holds these contacts of the zero switch in the positions shown in Fig. 11 when the cycle controller is in the zero position. Contact E-60 is arranged in series with a wire E-62 which is connected at one end to wire E-2. Wire E-62 is connected at E-64 to a wire E-65 leading in from wire E-5 and terminates at a terminal E-66. A lamp E-67 is inserted in this circuit so that when the cycle controller is inoperative this lamp lights. However, when switch SW-2 is closed as described above to cause contact E-41 to bridge wires E-42 and E-43, motors M-1 and M-2 are driven in a manner now to be described, and contacts E-60 and E-61 of the zero switch are reversed causing lamp E-67 to be doused and the press to be closed.

The circuit for driving motor M-1 includes a condenser E-68 in series with a wire E-69. Wire E-69 terminates at motor M-1 and at its opposite end is connected to wire E-62 described above.

Condenser E-68 is shunted between wire E-69 and terminal E-64 by a wire E-70 having in series therewith a normally closed contact E-71 controlled by a relay E-72. Another wire E-73 terminates at motor M-1, and this wire is also connected to wire E-62.

The circuit for relay E-72 will be described below, and the arrangement is such that when relay E-72 is energized to open contact E-71 power of a driving nature is delivered to motor M-1 through the condenser E-68. On the other hand, so long as relay E-72 is unenergized, the normally closed contact E-71 controlled thereby prevents motor M-1 from being driven in this manner.

In start position, the switch contacts E-55 and E-58 in the cycle controller are closed, and contacts E-56 and E-59 are open, and the follower for the time switch in the cycle controller is in the zero or start notch located in the timing disc that is adapted to be rotated by motor M-2. Switch contacts E-55 and E-58 are arranged in series along a wire E-75 which at one end is connected to terminal E-66 and at the other to a wire E-76. Wire E-76 leads from motor M-1 to a terminal E-78 on a wire E-79. Wire E-79 is connected to the terminal where wires E-2 and E-3 join and terminates at motor M-2. Another wire E-81 leads out of motor M-2 to terminal E-66, and terminal E-66 is connected to wire E-43 by a wire E-83.

From the foregoing circuit, it will be seen inasmuch as the normally closed contacts E-55 and E-58 are in series with each other along wire E-75 as well as with relay E-72, the latter will energize when contact E-41 of switch SW-2 is closed on wires E-42 and E-43. When relay E-72 energizes, contact E-71 controlled thereby opens and driving power is delivered to motor M-1 which rotates the cam shaft associated therewith. As this occurs, contact E-60 of the zero switch is allowed to open causing the signal lamp E-67 to be doused, and at the same time a holding circuit is established enabling motor M-2 to drive continuously until the zero switch is reversed at the end of the cycle. This holding circuit for motor M-2 will now be described.

Arranged in series along wire E-62 is the normally open contact E-61 of the zero switch, and when motor M-1 drives as described above this contact closes. In series with contact E-61 is a normally open contact E-85 under control of relay E-46. Accordingly, when contact E-41 of switch SW-2 is closed on wires E-42 and E-43, relay E-46 is energized closing the contact E-85 associated therewith, and this establishes a holding circuit for motor M-2 between wires E-2 and E-5 as will be clear from the wiring diagram.

Thus, motors M-1 and M-2 both drive simultaneously once switch contact E-41 is closed on wires E-42 and E-43. Motor M-1 rotates the cam shaft associated therewith, and the index cam carried thereby rotates from zero position to but not through the first index position whereat contacts E-55 and E-56 are reversed. Inasmuch as this opens wire E-75, relay E-72 is deenergized permitting contact E-71 to close, interrupting driving power delivered to motor M-1 through condenser E-68. However, as motor M-2 rotates the timing disc carried thereby, the initial or start notch rides past the follower for the timing switch, and as this occurs, contacts E-58 and E-59 in the timing switch reverse. Now, contacts E-56 and E-59 are closed, and these contacts are in series along a wire E-85 that shunts switch contacts E-55 and E-58. Accordingly, a new circuit is completed to relay E-72, contact E-71 controlled thereby again opens and motor M-1 drives the index cam through the first index position. As the index cam is rotated through the first index position the index contacts E-55 and E-56 again reverse whereupon E-55 is closed and E-56 opened, and inasmuch as contact E-58 in the timing switch is open at this time both wires E-75 and E-85 are broken and the drive to motor M-1 through the condenser E-68 is again interrupted. Therefore, motor M-1 is not enabled to rotate the cam shaft to the second index position, and this condition will prevail until motor M-2, which drives continuously, presents a new notch on the timing disc rotated thereby to the follower for the timing switch. This new notch represents the first "bump" in the cycle as will be pointed out below.

When relay E-46 is energized as described above to start motor M-2, a circuit is simultaneously established to solenoid E-17-2 for the 4-way valve H-5 causing this valve to shift to the press close position as described above. This is instituted by a normally open contact E-90 controlled by relay E-46 and a normally closed contact E-91 associated with the timer which will be described below. Thus, contacts E-90 and E-91 are arranged in series along a wire E-95 which is connected at one end to wire E-17-4. At the other end, wire E-95 is connected to a wire E-96, and wire E-96 in turn is connected at one end to a wire E-97. Wire E-97 is connected to terminal E-8 of switch SW-3, which is normally closed on this terminal for automatic control of the press. Therefore, solenoid E-17-2 energizes, and since current is conducted to wire E-17-4 at this time fluid under low pressure exclusively, or low pressure first followed by high pressure depending on the setting of switch SW-5, will be delivered to cylinders 50A, 50B and 86 causing the upper platen to close on the lower platen and ram 80 to compress the die.

When solenoid E-17-2 is energized through relay E-46 as described above, solenoid E-31 which holds valve H-5 in the press open position is at the same time deenergized. This is accomplished in the present instance by arranging a normally closed contact E-98 in series along wire E-96 which at the end opposite wire E-97 is connected to wire E-3. Contact E-98 is controlled by relay E-46, and accordingly, when the latter energizes to close contact E-90 thereof, contact E-98 is opened breaking the circuit to solenoid E-31.

The time interval between notches on the timing disc driven by motor M-2 determines when the press is to be "bumped." Thus, as the timing notch next following the initial or zero notch arrives at the follower for the timing switch, the timing switch follower drops into this next notch, whereupon contacts E-58 and E-59 reverse, closing contact E-58 and opening contact E-59 as shown. Inasmuch as contact E-55 in the index switch was closed when the index cam passed through the first index position, as described above, contacts E-55 and E-58 are now both closed in wire E-75, as shown, relay E-72 energizes, contact E-71 opens and motor M-1 drives the cam shaft into but not through the second index position. Thus, when the index cam arrives at this second index position, contacts E-55 and E-56 again reverse from the position shown in Fig. 11, and motor M-1 stopped inasmuch as contact E-59 remains open so long as the follower for the timing switch rides in the aforementioned notch next following the zero notch. When the index cam thus passes from the first to the second index position, the press is "bumped" in a way which will now be described.

As was noted above, two contacts E-50 and E-51 are associated with a pair of corresponding cams on the cam shaft driven by motor M-1. These contacts are both normally open and are arranged in series along a wire E-100 which at one end is connected to terminal E-9 of switch SW-3. Wire E-100 leads to and out of a motor M-3 which is adapted to drive the timer. At its other end, wire E-100 is connected to wire E-3, and it will be seen that this circuit enables motor M-3 to drive when contacts E-50 and E-51 are closed, assuming of course the switch SW-3 is set in the position shown for enabling the press to operate automatically.

To initially condition the circuit for the timer motor M-3, the arrangement is such that the cam controlled contact E-51 is closed by the corresponding cam on the shaft of motor M-1 when this shaft steps around from the zero position to the first index position as described above. Contact E-51 remains closed until the end of the curing cycle.

The cam controlled contact E-50, on the other hand, only closes when the press is to be "bumped" as determined by the timing disc and the index cam in the cycle controller, and hence until this condition is attained the timer motor M-3 does not drive. As was described above, the press is to be "bumped" when the time disc associated with motor M-2 arrives at the notch next subsequent to zero notch. Thus, as the shaft of motor M-1 rotates from the first to the second index position reversing the index switch and disabling motor M-1 from driving through the second index position, contact E-50 is momentarily closed and then reopened by the corresponding cam on the shaft of motor M-1. Since contact E-51 was previously closed at the commencement of the cycle as described above, power is delivered to motor M-3 through wire E-100 and the timer begins its cycle. Shunting contact E-51 and motor M-3 is a wire E-105 having in series therewith a relay coil E-106 for the clutch of motor M-3, and associated with this relay coil are three contacts adapted to be reversed when this coil is energized.

Thus, when the timer relay E-106 is energized, the normally closed contact E-91 previously noted opens, deenergizing solenoid E-17-2 for valve H-5. A second contact E-109, normally open, is controlled by the timer relay E-106, and this contact is arranged in series with a wire E-100 which shunts wire E-96 to wire E-3. Accordingly, when relay E-106 energizes to open contact E-91 thereof contact E-109 closes at the same time to establish a circuit to solenoid E-31 which shifts valve H-5 to the press open position to enable the press to be "bumped."

A second normally open contact E-112 controlled by the timer relay E-106 is afforded for establishing a holding circuit to motor M-3, inasmuch as the time during which the press is to remain open during the "bumping" period must be independent of the closing of contact E-50 which is cam controlled by motor M-1. Thus, contact E-112 is arranged in series with wire E-97 as shown, and wire E-97 is connected to wire E-105 by a bridge E-114. From this it will be seen that when relay E-106 is energized, contact E-112 closes to establish a holding circuit through switch SW-3 and contact E-51 to motor M-3. In this connection, it will be recalled that contact E-51 is held closed until the end of the curing cycle which conditions motor M-3 for driving each time contact E-50 is closed and opened between the several index positions.

The press is "bumped" by the timer in the above described manner for a few seconds only, and this period during which the press is held open is determined by the predetermined cycle for which the timer is set. Thus, there is a trip lever of the usual kind arranged on the shaft of motor M-3, and as motor M-3 completes a cycle of operation, depending upon the predetermined time for which this motor is set, this trip lever reverts contact E-112 to the normally open position shown interrupting the holding circuit for relay E-106 and stopping motor M-3. Contact E-91 closes and contact E-109 opens. This deenergizes solenoid E-31 and enables solenoid E-17-2 to energize, so that the press is automatically closed.

During the "bumping" cycle, motor M-2 continues to drive of course and eventually the timing switch follower riding on the timing disc rides out of the aforesaid notch next following the initial or zero notch in the timing disc. When this occurs, the timing switch again reverses itself to close contact E-59 and open contact E-58. Inasmuch as the index switch at this time is reversed from the position shown in the wiring diagram, contacts E–56 and E–59 are now both closed in wire E–85, relay E–72 is energized and motor M–1 drives the cam shaft associated therewith to rotate the index cam through the second index position closing E–55 and opening E–56. Inasmuch as the timing switch contact at this time has been reversed from the position shown circuit to relay E–72 is interrupted, reverting contact E–71 to the normally closed position. This stops motor M–1 from driving to the third index position.

The foregoing sequence of operations entailing the closing and re-opening of the cam controlled contact E–50 each time the shaft of motor M–1 is rotated between index positions by the timing switch is repeated for successive "bumps" of the press until the timing disc rotated by motor M–2 reaches its re-set position. At the re-set position, a trip lever on the shaft of motor M–1 closes a normally open re-set switch E–120. This switch is in series with a wire E–121 connected at one end to wire E–85 between contacts E–56 and E–59 of the index and timing switches respectively. Wire E–121 is connected at the opposite end to wire E–76, and arranged in series with the re-set switch is a re-set solenoid E–122 for motor M–2.

Thus, when motor M–2 rotates the last timing notch past the timing switch follower, the timing switch reverses from the position shown in Fig. 11 so that contact E–59 thereof is closed. At this time of course the index cam operated by motor M–1 is stationarily set at the last index position ready to pass therethrough and when thus positioned contacts E–55 and E–56 of the index switch are reversed from that shown in Fig. 11 so that contact E–56 is closed. Since contacts E–56 and E–59 are now both closed in wire E–85, relay E–72 is energized, and power is delivered to motor M–1 advancing the index cam through the last index position. Contact E–55 closes, contact E–56 opens, and the re-set lever controlled by motor M–1 advances immediately to the re-set switch E–120. As switch E–120 is closed in this manner, power is delivered to the re-set solenoid E–122 through the closed contact E–59, and motor M–2 rotates the timing disc rapidly around to the zero notch. Contact E–61 of the zero switch opens and motor M–2 is stopped with the timing switch follower disposed again in the zero notch of the timing disc to set the timing switch in the normal position shown in Fig. 11. As motor M–2 re-sets into the zero notch in this manner contact E–59 opens, E–58 closes, and the index and timing switches are again in the normal positions shown which conditions motor M–1 for a new start at the commencement of the next operation.

The arrangement for the contacts E–50 and E–51 controlled by corresponding cams associated with motor M–1 is such that as the cycle controller undergoes the automatic re-set operation described, contact E–50 is momentarily closed and re-opened while contact E–51 is opened and held open. Opening of contacts E–50 and E–51 in this way disables the timer motor M–3, but when contact E–50 is momentarily closed the timer relay E–106 is energized and contact E–112 thereof holds the circuit in so long as the cycle controller remains in the zero position.

When relay E–106 is energized at the end of the curing cycle in this manner, contact E–91 is opened, deenergizing solenoid E–17–2, and contact E–109 is closed to energize solenoid E–31. Consequently, valve H–5 is shifted by solenoid E–31 to the press open position to enable die to be unloaded from the opened press.

Finally it may be pointed out that a signal E–130 is arranged to sound when the cycle controller is in zero position. Thus, this signal is arranged in series with the re-set circuit by a wire E–131 which is connected to wire E–121 and which leads through the signal E–130 to wire E–2.

At the commencement of the next curing cycle on a new set of thermosetting preforms, the cam for contact E–51 on the shaft of motor M–1 closes this contact as motor M–1 advances out of zero position, and motor M–3 is driven through the holding circuit afforded by relay E–106 and contact E–112 thereof to time out, causing the trip lever operated thereby to open contact E–112. Motor M–3 then stops and does not drive again until energized at the first "bumping" period in this next curing cycle. When this occurs, the trip lever for holding contact E–112 of relay E–106 open is relieved therefrom whereupon this relay is again conditioned to establish a holding circuit through contact E–112 and E–51 as described above.

Thus, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a press adapted to cure thermosetting compositions under pressure, a pair of platens arranged to have a die containing the composition to be subjected to pressure disposed therebetween, means to close one platen on the other to clamp the die, a ram arranged to apply pressure against the sides of the die in a direction normal to the closing direction of the one platen on the other, means to advance and retract said ram, means operative after said ram has been retracted to eject the die from between the platens, a table mounted on the press and disposed forward of one of the platens and substantially in the plane thereof to receive an end of the die being ejected, said table being mounted and supported in the press for advancing movement away from said one platen and means to advance the table parallel with the die to disclose an unloading cavity forward of said one platen and through which the cured composition in the die is adapted to drop.

2. In a press adapted to cure thermosetting compositions under pressure, a pair of platens arranged to have a die containing the composition to be subjected to pressure disposed therebetween, means to close one platen on the other to clamp the die, a ram arranged to apply pressure against the sides of the die in a direction normal to the closing direction of the one platen on the other, means to advance and retract said ram, means operative after said ram has been retracted to eject the die from between the platens, a table mounted on the press and disposed forward of one of the platens and substantially in the plane thereof to receive an end of the die being ejected, said table being mounted and supported in the press for advancing movement away from said one platen means operative to advance the table parallel with the die being ejected to disclose an unloading cavity forward of said one platen and through which the cured composition in the die is adapted to drop, and means to sense the passage of the end of the die on to the table and to thereupon actuate the means for advancing said table.

3. In a press adapted to cure thermosetting compositions under pressure, an expandable and contractable die affording a plurality of individual die cavities each adapted to be loaded with thermosetting compositions to be cured, a pair of platens arranged to have said die disposed therebetween, means to close one platen on the other to clamp said die therebetween, a ram arranged to apply die contracting pressure against the sides of the die in a direction normal to the closing direction of the one platen on the other, means to advance and retract said ram, means operative after said ram has been retracted to eject the expanded die from between the platens, a table mounted on the press and disposed forward of one of the platens and substantially in the plane thereof to receive an end of the die being ejected, said table being mounted and supported in the press for advancing movement away from said one platen means operative to advance the table parallel with the die being ejected to disclose an unloading cavity forward of said one platen and through which the cured composition in the die is adapted to drop, and means to sense the passage of the end of the die on to the table and to thereupon actuate the means for advancing said table with the die.

4. In a press adapted to cure thermosetting compositions under pressure, an expandable and contractable die affording a plurality of individual die cavities each adapted to be loaded with thermosetting composition to be cured, an upper and lower platen arranged to have said die disposed on the lower platen, means to close the upper platen on the lower to clamp said die therebetween, a ram arranged to apply die contracting pressure against the sides of the die in a direction normal to the closing direction of the upper platen on the lower, means to advance and retract said ram, means for advancing the die off said lower platen, a table having a rear edge normally located closely adjacent the forward edge of the lower platen and in the plane of the upper surface of said lower platen to receive an edge of the die advanced therefrom, said table being mounted and supported in the press for forward advancing movement away from the forward edge of said lower platen, means to sense the passage of the die on to the table as aforesaid and means to thereupon advance the table as aforesaid parallel with the die to disclose an unloading cavity between the rear edge of the table and the forward edge of the lower platen through which cured compositions in the die may drop.

5. In a press adapted to cure thermosetting compositions under pressure, and operating with fluid under pressure, an expandable and contractable die affording a plurality of normally expanded individual die cavities each adapted to be loaded with thermosetting compositions to be cured, a pair of platens arranged to have said die containing the composition to be cured disposed therebetween, a cylinder having a ram associated therewith for closing the one platen on the other to clamp the die, another cylinder having a ram associated therewith for applying pressure to the sides of the die in a direction normal to the closing direction of the one platen on the other to contract said die, means for ejecting and retracting the die relative to said platens, a movable table associated with one of the platens for receiving the leading edge of the die when ejected, said table being arranged to advance parallel with the die to disclose an unloading cavity of increasing dimension between the table and the platen with which it is associated, the leading and trailing edges of said die when disposed on said table and the platen associated therewith, respectively, thereby bridging the unloading cavity when the latter is fully disclosed to enable the cured composition in the die cavities to drop therethrough, means to sense the passage of the leading edge of the die on to said table, and means under control of said sensing means to enable the table to advance with the die as aforesaid.

6. In a press adapted to cure thermosetting compositions under pressure and operating with fluid under pressure, a pair of platens arranged to have a die containing the composition to be subjected to pressure disposed therebetween, a ram operating with fluid under pressure in one direction to close the one platen on the other to clamp the die, means arranged to furnish fluid under high pressure immediately to said ram when the one platen is to be closed on the other, a ram operating with fluid under pressure to apply pressure against the sides of the die disposed between the platens in a direction normal to the closing direction of the one platen on the other, means to initially advance the second-named ram toward the die with fluid under low pressure, means arranged to furnish fluid under high pressure to hold the second-named ram with high pressure against the die subsequent to the fluid under low pressure being effective to advance the ram, means to operate said rams in a reverse direction to enable the die to be ejected from between the platens, means to eject the die after said rams have been reversed, a table disposed in the plane of one of said platens to receive the leading edge of the die being ejected, and means to sense the passage of the leading edge of the die on to said table and to enable the table to advance parallel with the die to disclose an unloading cavity of increasing dimension between the leading and trailing edges of the die which bridge said cavity when fully disclosed.

7. In a press adapted to cure thermosetting compositions under pressure, and operating with fluid under pressure, a pair of vertically spaced platens arranged to have a die containing the composition to be cured disposed therebetween, a cylinder having a ram associated therewith for closing the one platen on the other to clamp the die, another cylinder having a ram associated therewith for applying pressure to the sides of the die in a horizontal direction normal to the closing direction of the one platen on the other, means adapted to eject and retract the die relative to said platens, a table having an upper surface disposed in the plane of the upper surface of the lower one of the platens for receiving the leading edge of the die when ejected, said table being movably supported and arranged in the press to advance parallel with the die being ejected to disclose an unloading cavity of increasing dimension between the table and the platen with which it is associated, the leading and trailing edges of said die when disposed on said table and the platen associated therewith, respectively, bridging the unloading cavity when the latter is fully disclosed, means to sense the passage of the leading edge of the die on to said table, and means under control of said sensing means for enabling the table to advance with the die as aforesaid.

8. In a press adapted to cure thermosetting compositions under pressure, and operating with fluid under pressure, an expandable and contractable die affording a plurality of normally expanded individual die cavities each adapted to be loaded with thermosetting compositions to be cured, a pair of spaced upper and lower platens arranged to have said die containing the composition to be cured disposed theerbetween, a cylinder having a ram associated therewith for closing the one platen on the other to clamp the die, means to furnish said cylinder with fluid under high pressure immediately as the one platen is to be closed on the other, a cylinder having a ram associated therewith for applying pressure to the sides of the die in a direction normal to the closing direction of the one platen on the other, means to furnish the second-named cylinder with fluid under high pressure to compress the die with high pressure, means to initially operate the second-named ram with fluid under low pressure prior to fluid under high pressure being supplied thereto, means for ejecting and retracting the die in a horizontal direction relative to said platens, a horizontal table having an upper surface substantially in the plane of the upper surface of the lower one of the platens and having a rear edge normally disposed closely adjacent the forward edge of said platen for receiving the leading edge of the die when ejected, said table being supported and arranged in the press to advance parallel with the die to disclose an unloading cavity of increasing dimension between the rear edge of the table and the forward edge of the platen with which it is associated, the leading and trailing edges of said die when disposed on said table and the platen associated therewith, respectively, having said individual die cavities bridging the unloading cavity when the latter is fully disclosed, means to sense the passage of the leading edge of the die on to said table, and means under control of said sensing means to enable the table to advance with the die as aforesaid.

References Cited in the file of this patent

UNITED STATES PATENTS

| | | |
|---|---|---|
| 1,417,743 | Kempton | May 30, 1922 |
| 1,707,314 | Towler et al. | Apr. 2, 1929 |
| 1,869,598 | Leguillon | Aug. 2, 1932 |
| 1,963,126 | Fuchs | June 19, 1934 |
| 2,193,395 | Dewey | Mar. 12, 1940 |
| 2,374,233 | Pfleumer | Apr. 24, 1945 |
| 2,394,260 | Pfeilsticker | Feb. 5, 1946 |
| 2,443,621 | Kemble | June 22, 1948 |
| 2,476,272 | Bauman | July 19, 1949 |
| 2,780,832 | Schmitt et al. | Feb. 12, 1957 |